US012060735B2

(12) United States Patent
Hiramoto

(10) Patent No.: US 12,060,735 B2
(45) Date of Patent: Aug. 13, 2024

(54) VEHICLE DOOR OPERATION DEVICE

(71) Applicant: MITSUI KINZOKU ACT CORPORATION, Yokohama (JP)

(72) Inventor: Shigenori Hiramoto, Yokohama (JP)

(73) Assignee: Mitsui Kinzoku Act Corporation (JP)

( * ) Notice: Subject to any disclaimer, the term of this patent is extended or adjusted under 35 U.S.C. 154(b) by 307 days.

(21) Appl. No.: 17/389,125

(22) Filed: Jul. 29, 2021

(65) Prior Publication Data

US 2022/0034128 A1 Feb. 3, 2022

(30) Foreign Application Priority Data

Jul. 31, 2020 (JP) ................................ 2020-130815

(51) Int. Cl.

*E05B 77/24* (2014.01)
*E05B 77/26* (2014.01)
*E05B 81/70* (2014.01)
*E05B 83/40* (2014.01)

(52) U.S. Cl.

CPC .......... *E05B 77/245* (2013.01); *E05B 77/265* (2013.01); *E05B 83/40* (2013.01); *E05B 81/70* (2013.01)

(58) Field of Classification Search

CPC .......... E05B 77/22; E05B 77/24; E05B 77/26; E05B 77/245; E05B 77/265; E05B 83/40; Y10S 292/46; Y10S 292/65

See application file for complete search history.

(56) References Cited

U.S. PATENT DOCUMENTS

| | | | | |
|---|---|---|---|---|
| 6,135,513 A * | 10/2000 | Hamada | E05B 81/20 292/201 |
| 2005/0099022 A1 | 5/2005 | Wakatsuki | |
| 2012/0074719 A1 * | 3/2012 | Nagaoka | E05B 81/16 292/336.3 |
| 2018/0274268 A1 * | 9/2018 | Suholutskaja | E05B 77/28 |

FOREIGN PATENT DOCUMENTS

| | | |
|---|---|---|
| JP | 2001-182403 A | 7/2001 |
| JP | 2005-146537 A | 6/2005 |
| JP | 2014-005613 A | 1/2014 |

OTHER PUBLICATIONS

Office Action issued in corresponding Japanese Patent Application No. 2020-130815 dated Dec. 5, 2023 (6 pages).

* cited by examiner

*Primary Examiner* — Christine M Mills
*Assistant Examiner* — Yahya Sidky
(74) *Attorney, Agent, or Firm* — Foley & Lardner LLP

(57) ABSTRACT

A vehicle door operation device includes an inside handle, a full open unlocking lever for transmitting a closing operation of the inside handle to a full open door latch device, and a full closure unlocking lever for transmitting an opening operation of the inside handle to a full closure door latch device. The inside handle has first and projecting portions, and when the inside handle rotates in a first direction by the closing operation, the first projecting portion is brought into abutment with the full open unlocking lever to enable the full open unlocking lever to operate, whereas when the inside handle rotates in a second direction by the opening operation, the second projecting portion is brought into abutment with the full closure unlocking lever to enable the full closure unlocking lever to operate.

7 Claims, 11 Drawing Sheets

VEHICLE DOOR OPERATION DEVICE

CROSS-REFERENCE TO RELATED APPLICATIONS

This application is based on and claims priority under 35 USC 119 from Japanese Patent Application No. 2020-130815 filed on Jul. 31, 2020, the contents of which are incorporated herein by reference.

TECHNICAL FIELD

The present disclosure relates to a vehicle door operation device for opening and closing a door of a vehicle.

BACKGROUND

A related art discloses a vehicle door operation device provided on a door of a vehicle so as to be operated to open and close the door of the vehicle. For example, JP-A-2014-005613 (PTL 1) discloses a vehicle door operation device including an inside handle provided on a passenger compartment side of a sliding door and a lever mechanism for transmitting an operation of the inside handle to a locking mechanism (a front door lock device and a rear door lock device) for locking the sliding door in a full closure position. In addition, JP-A-2001-182403 (PTL 2) discloses a vehicle door operation device including an inside handle provided on a passenger compartment side of a sliding door and a remote control unit for transmitting an operation of the inside handle to a latch unit for holding the sliding door in a closure state.

However, in the vehicle door operation device of PTL 1, a rod (a rod 36 in PTL 1) needs to be provided which couples together a handle operating portion of the inside handle and a slide bush provided on a first lever of the lever mechanism for transmission of an operation of the inside handle to the lever mechanism. Similarly, in the vehicle door operation device of PTL 2, a rod (a rod 61a in PTL 2) needs to be provided which couples together the inside handle and an inside lever of the remote control unit for transmission of an operation of the inside handle to the remote control unit.

In this way, with the related-art vehicle door operation devices, since the transmission member such as the rod or the like for transmitting the operation of the inside handle to the lever mechanism is required, the number of components involved therein is increased, which results in a problem in that reduction in size of those vehicle door operation devices becomes difficult.

SUMMARY

Illustrative aspects of the present disclosure provide a vehicle door operation device which can reduce the number of components involved therein to thereby enable the reduction in size thereof.

According to the present disclosure, when the inside handle is rotated in the first direction by the closing operation, the first projecting portion is brought into abutment with the full open unlocking lever to enable the full open unlocking lever to operate, while when the inside handle is rotated in the second direction by the opening operation, the second projecting portion is brought into abutment with the full closure unlocking lever to enable the full closure unlocking lever to operate. As a result, the closing operation of the inside handle can be transmitted to the full open unlocking lever without providing a transmission member such as a rod for transmitting the closing operation of the inside handle to the full open unlocking lever, while the opening operation of the inside handle can be transmitted to the full closure unlocking lever without providing a transmission member such as a rod for transmitting the opening operation of the inside handle to the full closure unlocking lever. As a result, with the vehicle door operation device, it is possible to reduce the number of components involved in the vehicle door operation device to thereby enable the reduction in size thereof.

DETAILED DESCRIPTION

Figure 1:
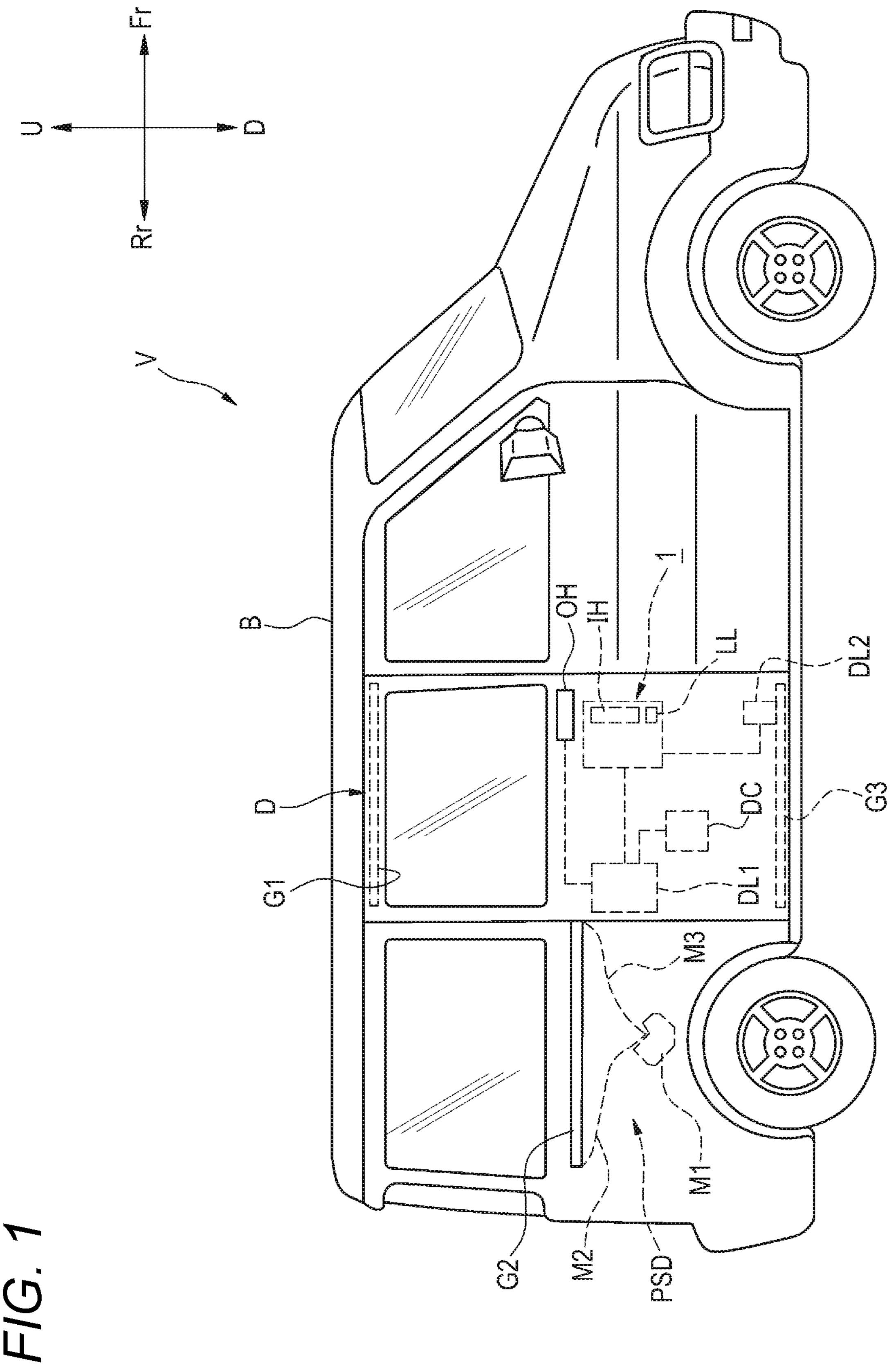
FIG. 1 is a side view showing schematically a vehicle body and a door of a vehicle on which a vehicle door operation device according to an illustrative embodiment of the disclosure is mounted.

Hereinafter, an illustrative embodiment of a vehicle on which a vehicle door operation device of the disclosure is mounted will be described based on accompanying drawings. The drawings are to be seen in a direction in which reference signs given therein look properly. In addition, when referred to in the specification or the like, for a simple and clear description, front-rear, left-right, and up-down directions denote such directions as seen from a driver of the vehicle, and in the drawings, the front, rear, left, right, up, and down of the vehicle are denoted by Fr, Rr, L, R, U, and D, respectively. Additionally, the left-right direction is also referred to as a vehicle width direction.

Vehicle

As shown in FIG. 1, a vehicle door operation device 1 according to the illustrative embodiment is provided on a door D of a vehicle V. In this illustrative embodiment, the door D is disposed on a right-hand side of a vehicle body B of the vehicle V and configures a sliding door that is supported so as to slide in a front-rear direction to be opened and closed. Consequently, when referred to in the following description, an outer side denotes a right side, while an inner side denotes a left side.

The door D is supported by an upper guide rail G1, a waist guide rail G2, and a lower guide rail G3, which are fixed to the side of the vehicle body B in such a manner as to extend in the front-rear direction, so as to slide in the front-rear direction to be opened and closed. The upper guide rail G1 is fixed to an upper portion of a door opening portion in the vehicle body B in such a manner as to extend in the front-rear direction. The waist guide rail G2 is fixed to the side of the vehicle body B at the rear of the door opening portion in a position situated substantially at a center of the door opening portion in an up-down direction in such a manner as to extend in the front-rear direction. The lower guide rail G3 is fixed to a lower portion of the door opening portion in the vehicle body B in such a manner as to extend in the front-rear direction.

The vehicle door operation device 1 is attached to an inner panel that makes up a side of the door D on an inner side. The vehicle door operation device 1 includes an inside handle IH that is operated when the door D is operated to be opened or closed from an inside of a passenger compartment and a locking lever LL that is operated when the door D is manually switched between an unlocked state and a locked state. The inside handle IH and the locking lever LL are disposed on the inner side of the door D. The inside handle IH and the locking lever LL can be operated from the inside of the passenger compartment of the vehicle V.

An outside handle OH is provided on the door D so as to be operated to open or close the door D from an outside of the passenger compartment of the vehicle V. The outside handle OH is attached to an outer panel that makes up a side of the door D on an outer side. The outside handle OH is disposed on the outer side of the door D, so that the outside handle OH can be operated from an outside of the passenger compartment of the vehicle V.

The unlocked state means a state in which the door D can be opened by activating the outside handle OH and the inside handle IH for an opening operation, while the locked state means a state in which the door D cannot be opened even by activating the outside handle OH and the inside handle IH for the opening operation.

The door D includes a full closure door latch device DL1 for holding the door D in a closure position, a full open door latch device DL2 for holding the door D in a full open position, and a closure device DC coupled to the full closure door latch device DL1 and configured to forcibly close up the door D from a door ajar state to a full closure locking state.

The full closure door latch device DL1 is disposed at a rear portion of the door D. The full closure door latch device DL1 has a known structure and includes a full closure latch mechanism portion (not shown) configured to come into meshing engagement with a full closure striker (not shown) fixed to the vehicle body B to thereby hold the door D in a closure position and a full closure release mechanism portion (not shown) configured to release the meshing engagement of the full closure latch mechanism portion with the full closure striker when opening the door D. The door D is put in the door ajar state when the full closure latch mechanism portion of the full closure door latch device DL1 is in slight meshing engagement with the full closure striker fixed to the vehicle body B. The door D is put in a full closure locking state in which the door D is held in a full closure position when the full closure latch mechanism portion of the full closure door latch device DL1 is in full meshing engagement with the full closure striker fixed to the vehicle body B.

The closure device DC includes a motor (not shown) and is coupled to the full closure latch mechanism portion of the full closure door latch device DL1. When the door D is activated for the closing operation, the closure device DC causes the full closure latch mechanism portion of the full closure door latch device DL1 to move from a half latch state to a full latch state with an electric power of the motor. As a result, the door D is forcibly closed up from the door ajar state to the full closure state by the closure device DC.

The full open door latch device DL2 is disposed at a front lower portion of the door D. The full open door latch device DL2 has a known structure and includes a full open latch mechanism portion (not shown) configured to come into meshing engagement with a full open striker (not shown) fixed to the vehicle body B to thereby hold the door D in a full open position and a full open release mechanism portion (not shown) configured to release the meshing engagement of the full open latch mechanism portion with the full open striker when closing the door D. The door D is put in a full open locking state in which the door D is held in the full open position when the full open latch mechanism portion of the full open door latch device DL2 is in meshing engagement with the full open striker fixed to the vehicle body B.

An electric powered door opening and closing device PSD for opening and closing the door D using electric power is provided in an inside of the side of the vehicle body B in a position situated to the rear of the door opening portion in the vehicle body B. The electric powered door opening and closing device PSD has a known structure and includes a driving unit M1, and an opening cable M2 and a closing cable M3, which are wound around a rotational drum in such a manner as to be taken up and fed out. The driving unit M1 includes a motor, a reduction gear mechanism for decelerating the rotation of the motor, and the rotational drum configured to be rotated by the reduction gear mechanism. In the electric powered door opening and closing device PSD, the opening cable M2 and the closing cable M3, which are fed out from the rotational drum, are connected to the door D while being stretched around corresponding reverse pulleys (not shown) supported on the waist guide rail G2, whereby the power of the motor of the driving unit M1 is transmitted to the door D by way of the opening cable M2 or the closing cable M3 to open or close the door D using the electric power.

Configuration of the Vehicle Door Operation Device

{Base Plate}

Figure 2:
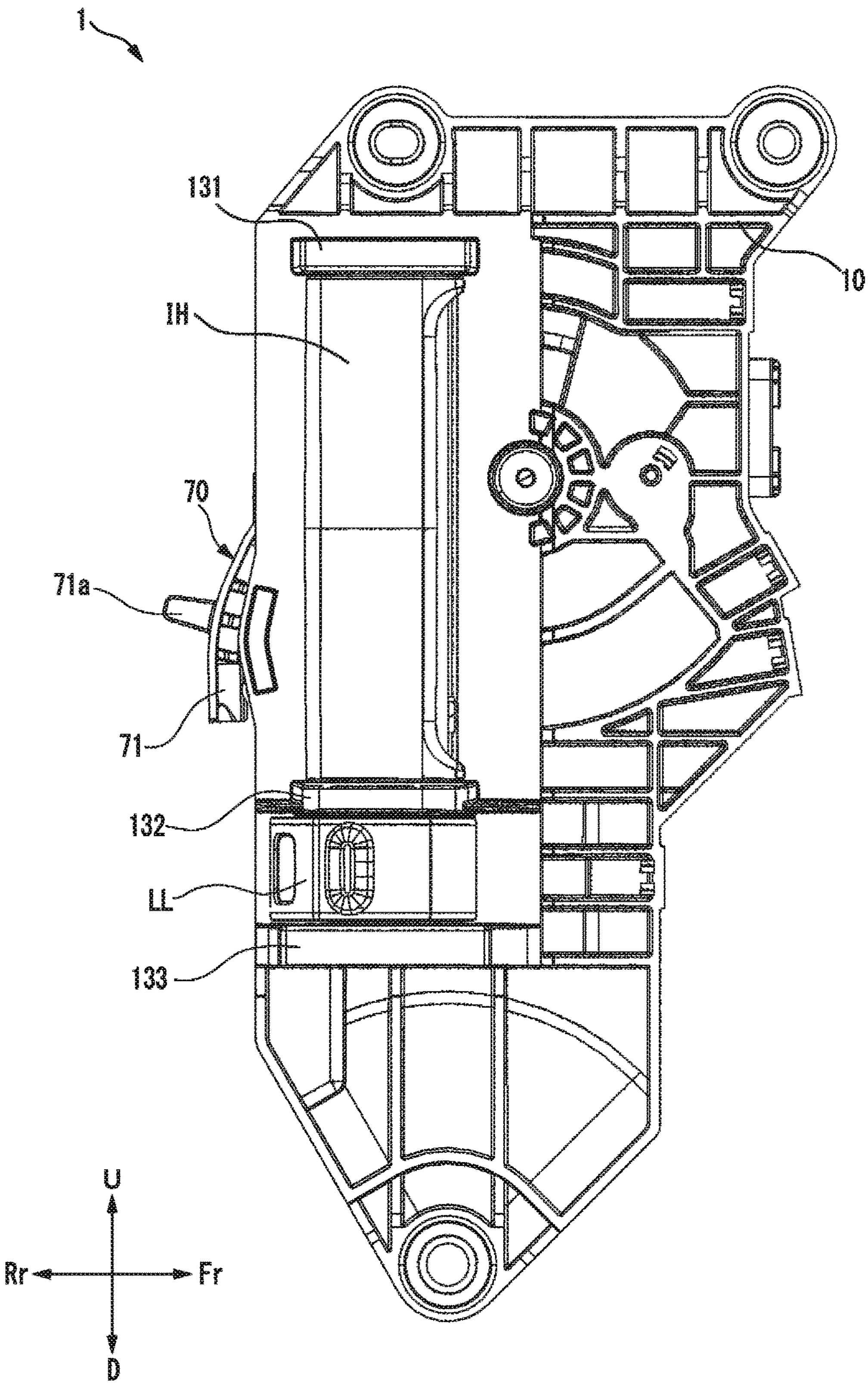
FIG. 2 is a front view of the vehicle door operation device of the disclosure as seen from an outer side of the vehicle.
Figure 3:
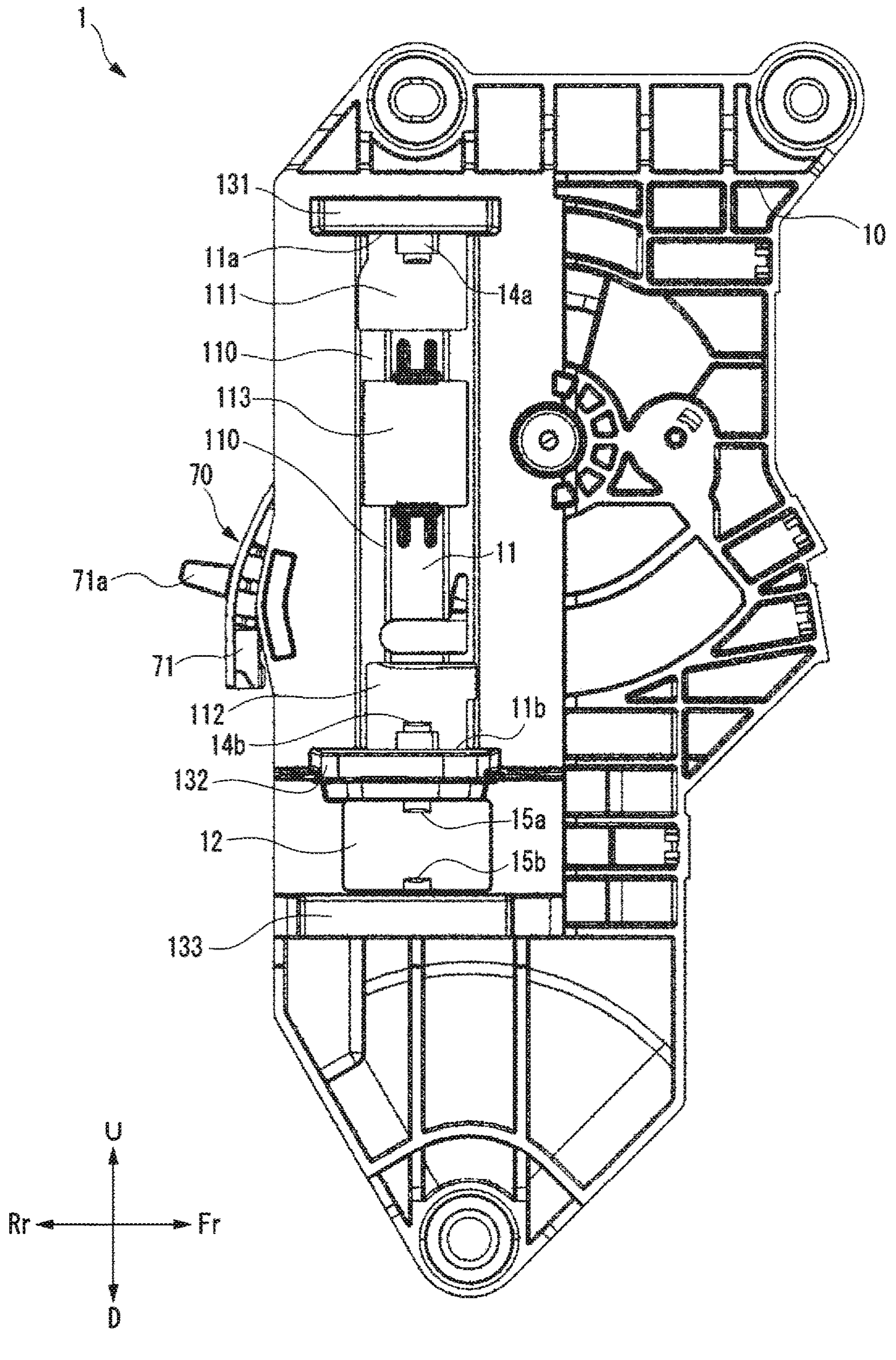
FIG. 3 is a front view of the vehicle door operation device shown in FIG. 2 as seen from the outer side of the vehicle with an inside handle and a locking lever removed.
Figure 4:
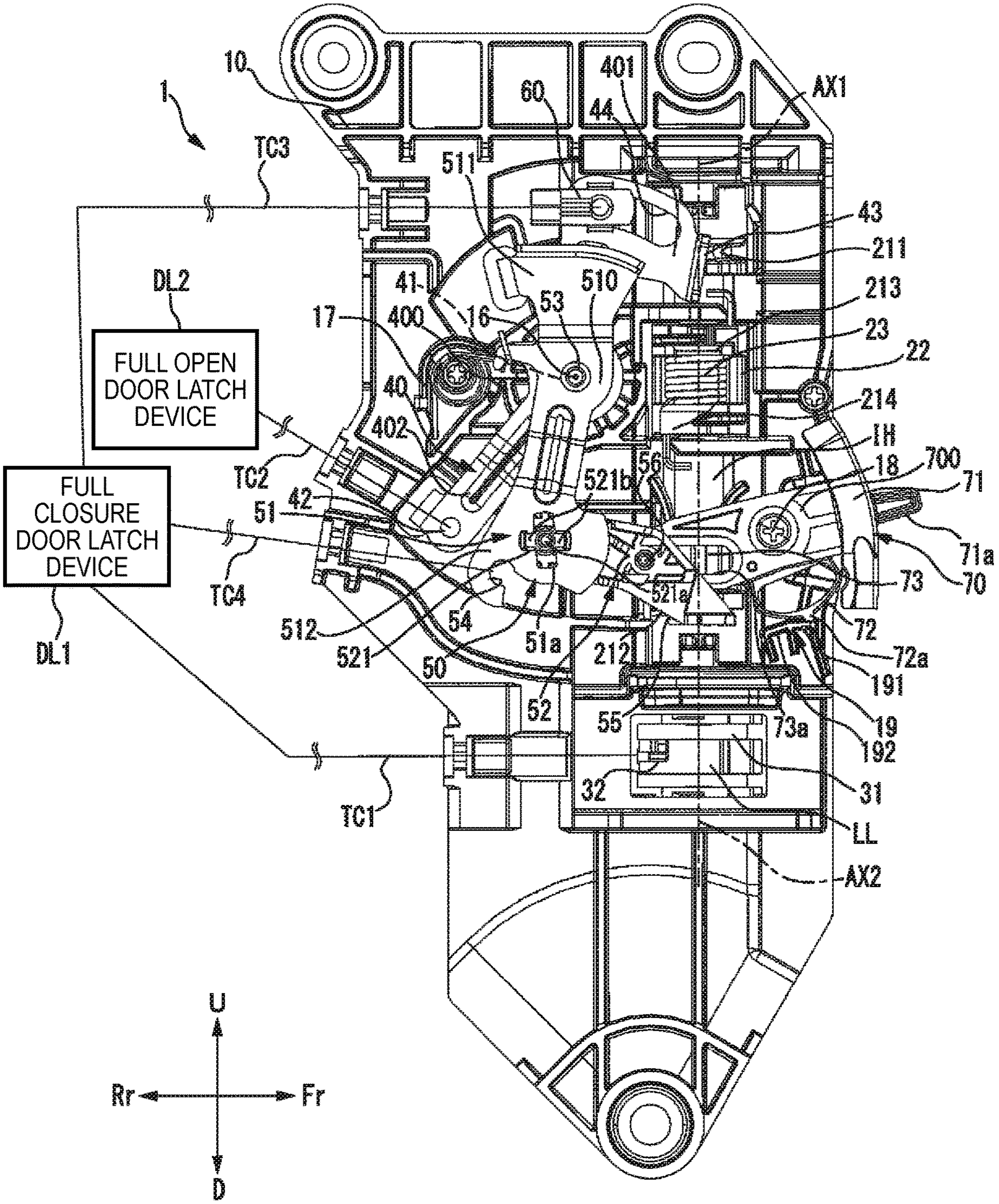
FIG. 4 is a front view of the vehicle door operation device as seen from the outer side of the vehicle with an inside handle operation detection unit removed.
Figure 5:
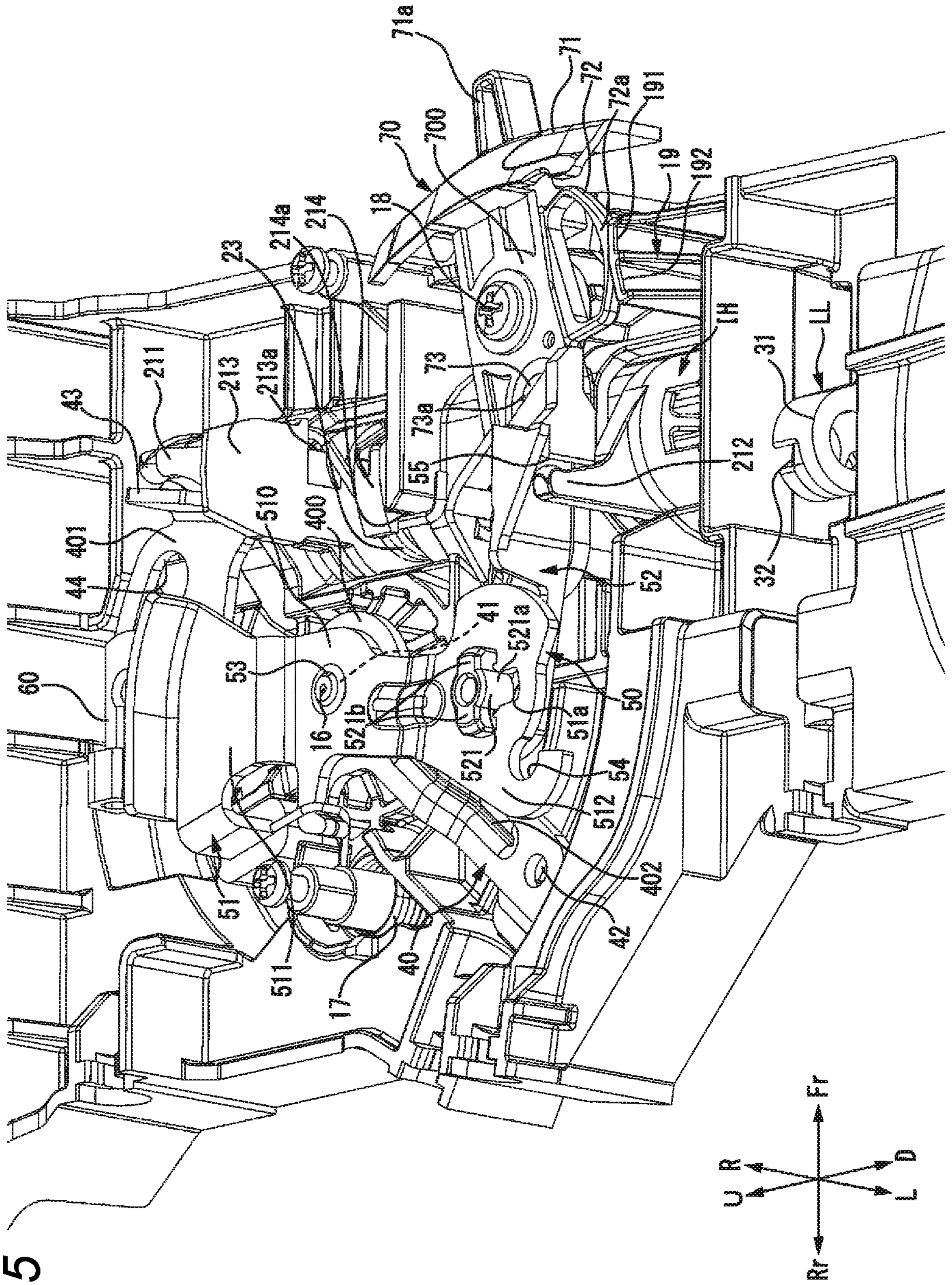
FIG. 5 is a perspective view of a main part of the vehicle door operation device shown in FIG. 4 as seen obliquely from below.

As shown in FIGS. 2 and 3, the vehicle door operation device 1 includes a base plate 10, which extends in the up-down direction and in the front-rear direction and which is fixed to the door D.

An inside handle accommodating portion 11, which is formed substantially into a rectangular shape long in the up-down direction in a side view and substantially similar to the shape of the inside handle IH and which has a recessed shape recessed towards the outer side, is formed on a side of the base plate 10 which is on the inner side. A locking lever opening portion 12 is formed in the base plate 10 in a position substantially coinciding with the inside handle accommodating portion 11 in the front-rear direction and lying below the inside handle accommodating portion 11. The locking lever opening portion 12 passes through the side on the inner side and a side on the outer side of the base plate 10. The locking lever opening portion 12 has a substantially quadrangular shape and has an opening area that is smaller than an area of the inside handle accommodating portion 11. A first projecting wall 131, a second projecting wall 132, and a third projecting wall 133 are provided on the side of the base plate 10 which lies on the inner side. The first projecting wall 131 projects from an upper end portion of the inside handle accommodating portion 11 towards the inner side. The second projecting wall 132 projects towards the inner side between a lower end portion of the inside handle accommodating portion 11 and an upper end portion of the locking lever opening portion 12. The third projecting wall 133 projects from a lower end portion of the locking lever opening portion 12 towards the inner side.

The inside handle accommodating portion 11 has a recessed surface 110 which is depressed towards the outer side into a recessed shape, an upper end face 11*a* which extends in the front-rear direction and in the left-right direction at an upper end of the recessed surface 110, and a lower end face 11*b* which extends in the front-rear direction and in the left-right direction at a lower end of the recessed surface 110.

A first opening portion 111, which passes through the side on the inner side and the side on the outer side of the base plate 10, is provided at an upper end portion of the recessed surface 110 of the inside handle accommodating portion 11. A second opening portion 112, which passes through the side on the inner side and the side on the outer side of the base plate 10, is provided at a lower end portion of the recessed surface 110 of the inside handle accommodating portion 11. A third opening portion 113 is provided between the first opening portion 111 and the second opening portion 112 in the recessed surface 110 of the inside handle accommodating portion 11.

An upper locking portion 14*a* of a substantially cylindrical shape is provided on the upper end face 11*a* of the inside handle accommodating portion 11 in such a manner as to project downwards. A lower locking portion 14*b* of a substantially cylindrical shape is provided on the lower end face 11*b* of the inside handle accommodating portion 11 in such a manner as to project upwards. The upper locking portion 14*a* and the lower locking portion 14*b* are disposed so that a cylindrical center axis of the upper locking portion 14*a* is coaxial with a cylindrical center axis of the lower locking portion 14*b*.

An upper locking portion 15*a* is provided on a lower surface of the second projecting wall 132 in such a manner as to project downwards. The upper locking portion 15*a* has a substantially cylindrical shape. A lower locking portion 15*b* is provided on an upper surface of the third projecting wall 133 in such a manner as to project upwards. The lower locking portion 15*b* has a substantially cylindrical shape. The upper locking portion 15*a* and the lower locking portion 15*b* are disposed so that a cylindrical center axis of the upper locking portion 15*a* is coaxial with a cylindrical center axis of the lower locking portion 15*b*.

The vehicle door operation device 1 includes further inside handle IH and the locking lever LL, which are supported on the base plate 10.

{Inside Handle}

As shown in FIGS. 2 to 5, the inside handle IH is disposed in the inside handle accommodating portion 11 on the base plate 10 and is locked in place by the upper locking portion 14*a* and the lower locking portion 14*b*. An imaginary line extending in the up-down direction through the cylindrical center axis of the upper locking portion 14*a* and the cylindrical center axis of the lower locking portion 14*b* which are disposed coaxially configures an inside handle axis AX1. The inside handle IH is supported on the base plate 10 by the upper locking portion 14*a* and the lower locking portion 14*b* in such a manner as to rotate clockwise and counterclockwise about the inside handle axis AX1 extending in the up-down direction as seen from above.

A first projecting portion 211 projecting radially outwards of the inside handle axis AX1 is provided on the inside handle IH on an outer side of the inside handle axis AX1. The first projecting portion 211 is provided at an upper end side of the inside handle IH and projects to the outer side from the first opening portion 111 of the base plate 10.

A second projecting portion 212 projecting radially outwards of the inside handle axis AX1 is provided on the inside handle IH on the outer side of the inside handle axis AX1. The second projecting portion 212 is provided at a lower end side of the inside handle IH and projects to the outer side from the second opening portion 112 in the base plate 10.

A third projecting portion 213 and a fourth projecting portion 214, which project radially outwards of the inside handle axis AX1, are provided on the inside handle IH on the outer side of the inside handle axis AX1. The third projecting portion 213 and the fourth projecting portion 214 are provided between the first projecting portion 211 and the second projecting portion 212 of the inside handle IH and both project to the outer side from the third opening portion 113 in the base plate 10. The third projecting portion 213 is provided above the fourth projecting portion 214. A spring accommodating portion 22, which is depressed from the outer side towards the inner side into a recessed shape, is formed between the third projecting portion 213 and the fourth projecting portion 214 on the inside handle IH. A notched groove 213*a* is formed on a front surface of the third projecting portion 213 in such a manner as to extend in the up-down direction. A notched groove 214*a* is formed on a rear surface of the fourth projecting portion 214 in such a manner as to extend in the up-down direction.

A torsion coil spring 23 is accommodated in the spring accommodating portion 22 on the inside handle IH. The torsion coil spring 23 is disposed in the up-down direction. An upper end side of the torsion coil spring 23 extends upwards while passing through the notched groove 213*a* formed on the front surface of the third projecting portion 213 of the inside handle IH and is locked to the base plate 10, and the other end side of the torsion coil spring 23 extends downwards while passing through the notched groove 214*a* formed on the rear surface of the fourth projecting portion 214 of the inside handle IH and is locked to the base plate 10.

When left inactive, the inside handle IH is held in a neutral position by means of a biasing force of the torsion coil spring 23. When an occupant inside the passenger compartment activates the inside handle IH for the closing operation, the inside handle IH rotates clockwise through a predetermined angle about the inside handle axis AX1 as seen from above. Then, when the occupant in the passenger compartment finishes the closing operation, releasing his or her hold on the inside handle IH, the inside handle IH is allowed to return to the neutral position by means of the biasing force of the torsion coil spring 23. When the occupant in the passenger compartment activates the inside handle IH for the opening operation, the inside handle IH rotates counterclockwise through a predetermined angle about the inside handle axis AX1 as seen from above. Then, when the occupant in the passenger compartment finishes the opening operation, releasing his or her hold on the inside handle IH, the inside handle IH is allowed to return to the neutral position by means of the biasing force of the torsion coil spring 23.

{Locking Lever}

The locking lever LL is disposed between the second projecting wall 132 and the third projecting wall 133 of the base plate 10 and is locked in place by the upper locking portion 15*a* and the lower locking portion 15*b*. An imaginary line extending in the up-down direction while passing through the cylindrical axis of the upper locking portion 15*a* and the cylindrical axis of the lower locking portion 15*b* which are disposed coaxially configures a locking lever axis AX2. The locking lever LL is supported on the base plate 10 by the upper locking portion 15*a* and the lower locking portion 15*b* in such a manner as to rotate clockwise and counterclockwise about the locking lever axis AX2 extending in the up-down direction as seen from above.

A first projecting portion 31 extending radially outwards of the locking lever axis AX2 is provided on the locking lever LL on the outer side of the locking lever axis AX2. The projecting portion 31 projects to the outer side from the locking lever opening portion in the base plate 10. A connecting portion 32 taking the form of a through hole is provided in the projecting portion 31 in such a manner as to pass through the projecting portion 31 in the up-down direction. One end portion of an operation force transmitting member TC1, which is made up of a Bowden cable or the like, is connected to the connecting portion 32. The operation force transmitting member TC1 extends towards the rear from the connecting portion 32, while the other end portion of the operation force transmitting member TC1 is connected to the full closure door latch device DL1 described previously. The locking lever LL is held in a locking position or an unlocking position. The locking position of the locking lever LL is a position where the operation force transmitting member TC1 is not pulled. The unlocking position of the locking lever LL is a position where the locking lever LL rotates counterclockwise through a predetermined angle about the locking lever axis AX2 from the locking position as seen from above. When the locking lever LL rotates counterclockwise through the predetermined angle about the locking lever Axis AX2 from the locking position as seen from above, the projecting portion 31 also rotates counterclockwise through the predetermined angle about the locking lever axis AX2 as seen from above. Since the projecting portion 31 is provided on the outer side of the locking lever axis AX2, when the projecting portion 31 rotates counterclockwise through the predetermined angle about the locking lever axis AX2 as seen from above, the projecting portion 31 is displaced to the front in a side view as seen from the outer side. Then, the operation force transmitting member TC1 connected to the connecting portion 32 is pulled to the front as a result of the projecting portion 31 being displaced to the front in the side view as seen from the outer side.

With the locking lever LL staying in the locking position and the operation force transmitting member TC1 pulled to the front, the full closure door latch device DL1, to which the other end portion of the operation force transmitting member TC1 is connected, is held in a state where the door D cannot be opened by making the opening operations of the outside handle OH and the inside handle IH ineffective.

A substantially cylindrical lever shaft 16 is provided on the base plate 10 in a position lying adjacent to the rear of the inside handle accommodating portion 11 in such a manner as to project towards the outer side in the vehicle width direction from a surface of the base plate 10 which faces the outer side. The vehicle door operation device 1 includes further a full open unlocking lever 40 and a full closure unlocking lever 50, which are disposed on the surface of the base plate 10 which faces the outer side. The full open unlocking lever 40 and the full closure unlocking lever 50 are both supported on the lever shaft 16. The full open unlocking lever 40 and the full closure unlocking lever 50 are supported on the lever shaft 16 in such a manner as to rotate clockwise and counterclockwise independently about the lever shaft 16 in the side view as seen from the outer side. In this illustrative embodiment, the full open unlocking lever 40 and the full closure unlocking lever 50 are both supported on the lever shaft 16 while being aligned side by side in the vehicle width direction in such a manner as that the full open unlocking lever 40 is positioned on the inner side and the full closure unlocking lever 50 is positioned on the outer side.

The other end side of a torsion coil spring 17, which is locked onto the base plate 10 at one end side, is locked onto the full open unlocking lever 40 and the full closure unlocking lever 50. Consequently, with the inside handle IH and the outside handle OH left inactive, the full open unlocking lever 40 and the full closure unlocking lever 50 are held in a neutral position by means of a biasing force of the torsion coil spring 17. When the inside handle IH and the outside handle OH are activated for operation, the full open unlocking lever 40 and the full closure unlocking lever 50 rotate clockwise or counterclockwise about the lever shaft 16 against the biasing force of the torsion coil spring 17 in the side view as seen from the outer side. When the operation of the inside handle IH and the outside handle OH is completed, the full open unlocking lever 40 and the full closure unlocking lever 50 are allowed to return to the neutral position by means of the biasing force of the torsion coil spring 17.

{Full Open Unlocking Lever}

When in the neutral position, the full open unlocking lever 40 takes a shape in which the full open unlocking lever 40 extends long in the up-down direction and slopes to the rear as it extends from a top towards a bottom thereof. The full open unlocking lever 40 has a central portion 400 where a through hole 41, through which the lever shaft 16 is passed, is formed, an upper portion 401 which extends forwards and upwards from the central portion 400, and a lower portion 402 which extends rearwards and downwards from the central portion 400.

A connecting portion 42, which takes a shape of a through hole passing through the full open unlocking lever 40 in the vehicle width direction, is provided at a lower end portion of the lower portion 402 of the full open unlocking lever 40. One end portion of an operation force transmitting member TC2, which is made up of a Bowden cable or the like, is connected to the connecting portion 42. The operation force transmitting member TC2 extends to the rear from the connecting portion 42. The other end portion of the operation force transmitting member TC2 is connected to the full open release mechanism portion of the full open door latch device DL2.

An abutment surface 43 is formed on the upper portion 401 of the full open unlocking lever 40 in such a manner as to project to an outside in the vehicle width direction. The abutment surface 43 is formed at a front end of the upper portion 401. The abutment surface 43 is formed in a position where the abutment surface 43 is brought into abutment with or comes to stay close to a rear face of the first projecting portion 211 of the inside handle IH when the full open unlocking lever 40 stays in the neutral position.

A locking portion 44 is formed on the upper portion 401 of the full open unlocking lever 40. The locking portion 44 has a shape of an arc-like elongate hole formed around the lever shaft 16 in the side view as seen from the outer side. An input member 60, to which an operation of the outside handle OH is transmitted, is locked on the locking portion 44 in such a manner as to slide along the locking portion 44 so as to move relative to the full open unlocking lever 40. One end portion of an operation force transmitting member TC3, which is made up of a Bowden cable or the like, is connected to the input member 60. The operation force transmitting member TC3 extends towards the rear from the input member 60, and the other end portion of the operation force transmitting member TC3 is connected to the full closure door latch device DL1. When the outside handle OH is activated for operation, the one end portion of the operation force transmitting member TC3 is pulled to the rear by way of the full closure door latch device DL1, and the input member 60 is displaced to the rear. The operation of the outside handle OH is transmitted to the input member 60 in the way described heretofore.

The input member 60 is provided in such a manner as to be positioned at a rear end of the locking portion 44, which is formed into the arc-like elongate hole, with the full open unlocking lever 40 staying in the neutral position. Consequently, when the outside handle OH is operated with the door D remaining in the full open locking state, the input member 60 is displaced to the rear by the operation force transmitting member TC3, whereby the upper portion 401 of the full open unlocking lever 40 is pulled to the rear by the input member 60. As a result, the full open unlocking lever 40 rotates counterclockwise about the lever shaft 16 in the side view as seen from the outer side. When the full open unlocking lever 40 rotates counterclockwise about the lever shaft 16 in the side view as seen from the outer side, the connecting portion 42 provided at the lower portion 402 of the full open unlocking lever 40 is displaced to the front, whereby the one end portion of the operation force transmitting member TC2 connected to the connecting portion 42 is pulled to the front. When the one end portion of the operation force transmitting member TC2 is pulled to the front, the full open release mechanism portion of the full open door latch device DL2, to which the other end portion of the operation force transmitting member TC2 is connected, is activated, whereby the meshing engagement of the full open latch mechanism portion of the full open door latch device DL2 with the full open striker of the door D is released. As a result, the door D is released from the full open locking state in which the door D is held in the full open position, whereby the closing operation is enabled. In this way, the input member 60 can activate the full open unlocking lever 40 for operation when the operation of the outside handle OH is transmitted to the input member 60. Then, the full open unlocking lever 40 can transmit the operation of the outside handle OH to the full open door latch device DL2.

{Full Closure Unlocking Lever}

The full closure unlocking lever 50 includes a lever main body 51 and a movable member 52 which is brought into relatively movable engagement with the lever main body 51.

When the full closure unlocking lever 50 stays in the neutral position, the lever main body 51 takes a shape in which the lever main body 51 extends long in the up-down direction and slopes slightly to the rear as it extends from a top towards a bottom thereof. When in the neutral position, the full open unlocking lever 40 takes the shape in which the full open unlocking lever 40 slopes more to the rear than the lever main body 51 as the full open unlocking lever 40 extends from the top to the bottom thereof. The lever main body 51 has a central portion 510 where a through hole 53, through which the lever shaft 16 is passed, is formed, an upper portion 511 which extends upwards from the central portion 510, and a lower portion 512 which extends rearwards and downwards from the central portion 510.

A connecting portion 54, having a hook shape in which it projects downwards and is bent to the front, is provided at a lower end portion of the lower portion 512 of the lever main body 51. One end portion of an operation force transmitting member TC4, which is made up of a Bowden cable or the like, is connected to the connecting portion 54. The operation force transmitting member TC4 extends to the rear from the connecting portion 54, and the other end portion of the operation force transmitting member TC4 is connected to the full closure release mechanism portion of the full closure door latch device DL1 described previously.

Further, a locking hole 51*a* is formed at the lower end portion 512 of the lever main body 51. The locking hole 51 has a shape of an elongate hole. In this illustrative embodiment, the locking hole 51*a* has a shape in which it extends long in the up-down direction and slopes slightly to the front as it extends from an upper end to a lower end thereof. The movable member 52 is locked in the locking hole 51*a*.

When the full closure unlocking lever 50 stays in the neutral position, the movable member 52 is long in the front-rear direction and extends in the front-rear direction while passing over the second projecting portion 212 provided on the inside handle IH. The movable member 52 has a shape in which the movable member 52 slopes downwards as it extends from the rear to the front. The movable member 52 extends in such a manner that a front end portion thereof stays ahead of the second projecting portion 212 of the inside handle IH.

A locking portion 521, which is configured to be locked on the lever main body 51, is provided at a rear end portion of the movable member 52. The locking portion 521 has a cylindrical portion 521*a* which projects substantially into a cylindrical shape from a surface of the movable member 52 which faces the outer side and a projecting portion 521*b* which projects to the front and the rear from a distal end portion of a cylindrical surface of the cylindrical portion 521*a* with the full closure unlocking lever 50 staying in the neutral position. When the movable member 52 causes the projecting portion 521*b* to pass through the locking hole 51*a* in the lever main body 51 from the inner side to the outer side to project further towards the outer side beyond the locking hole 51*a* in the lever main body 51 and then to rotate clockwise or counterclockwise about the cylindrical portion 521*a* in the side view as seen from the outer side, the surface of the movable member 52 which faces the outer side is brought into abutment with a surface of the lever main body 51 which faces the inner side, whereby the projecting portion 521*b* of the movable member 52 is brought into abutment with a surface of the lever main body 51 which faces the outer side. As a result, the movable member 52 is locked in the locking hole 51*a* in the lever main body 51 at the locking portion 521. The movable member 52 can move relatively to the lever main body 51 in such a manner as to rotate clockwise or counterclockwise about the cylindrical portion 521*a* in the side view as seen from the outer side, and the cylindrical portion 521*a* can move relatively within the locking hole 51*a* of the lever main body 51.

As a result, since the movable member 52 can easily be locked on the lever main body 51, the assembling characteristics of the vehicle door operation device 1 is improved.

An abutment surface 55 is formed at the front end portion of the movable member 52 in such a manner as to extend downwards and towards the outer side. The abutment surface 55 is formed in a position where the abutment surface 55 is brought into abutment with or put in close proximity to a front surface of the second projecting portion 212 of the inside handle IH with the full closure unlocking lever 50 staying in the neutral position.

Additionally, a projecting portion 56 is formed on the movable member 52 of the full closure unlocking lever 50 in such a manner as to project from a surface facing the inner side to the outer side substantially into a cylindrical shape.

{Child Lock Lever}

The vehicle door operation device 1 includes further a child lock lever 70 which is disposed on the surface of the base plate 10 which faces the outer side. The child lock lever 70 is supported on the base plate 10 with a bolt 18 passing therethrough in the vehicle width direction in a position lying adjacent to the front of the inside handle accommodating portion 11. The child lock lever 70 is configured to rotate clockwise and counterclockwise about the bolt 18 in the side view as seen from the outer side, so that the child lock lever 70 can be displaced between a child unlocking position and a child locking position.

The child lock lever 70 has a main body portion 700 extending in the front-rear direction, a cover portion 71 provided at a front end of the main body portion 700 in such a manner as to extend into an arc-like shape which is centered at the bolt 18 in the side view as seen from the outer side, and an operating portion 71*a* projecting to the front from the cover portion 71. The operating portion 71*a* is exposed from a front end face of the door D, so that the child lock lever 70 can be operated when the door D is left open.

An annular portion 72, which has an annular shape in the side view as seen from the outer side, is provided on a lower surface of the main body portion 700 of the child lock lever 70. An engagement projection 72*a*, which projects downwards, is formed at a lower end portion of the annular portion 72.

In this illustrative embodiment, the child lock lever 70 stays in the child unlocking position when the operating portion 71*a* of the child lock lever 70 is positioned up, and when the operating portion 71*a* of the child lock lever 70 is pulled downwards from the child unlocking position, the child lock lever 70 rotates clockwise about the bolt 18 in the side view as seen from the outer side to thereby be displaced into the child locking position. Then, when the operating portion 71*a* of the child lock lever 70 is pulled upwards from the child locking position, the child lock lever 70 rotates counterclockwise about the bolt 18 in the side view as seen from the outer side to thereby be displaced into the child unlocking position.

An engagement wall portion 19 is formed on the side of the base plate 10 which faces the outer side in such a manner as to project to the outer side from the surface on the outer side of the base plate 10 and extend in the front-rear direction in a position corresponding to the engagement projection 72*a* of the child lock lever 70 in the side view as seen from the outer side. The engagement projection 72*a* of the child lock lever 70 is in abutment with an upper surface of the engagement wall portion 19.

The engagement wall portion 19 of the base plate 10 has a front side portion 191 extending substantially horizontally in the front-rear direction and a rear side portion 192 extending in the front-rear direction while sloping down as it extends to the rear from a rear end of the front side portion 191 in the side view as seen from the outer side. An upper surface of the front side portion 191 and an upper surface of the rear side portion 192 configure a continuous surface, which makes up an upper surface of the engagement wall portion 19.

When the child lock lever 70 is staying in the child unlocking position, the engagement projection 72*a* of the child lock lever 70 is in engagement with the engagement wall portion 19 of the base plate 10 in a position lying in the vicinity of a front end of the upper surface of the front side portion 191.

A locking groove 73 having an elongate hole shape is formed in the main body portion 700 of the child lock lever 70 on an opposite side to a side where the operating portion 71*a* is provided across the bolt 18 in such a manner as not only to pass through the main body portion 700 in the vehicle width direction but also to extend substantially horizontally in the front-rear direction when the child lock lever 70 is staying in the child unlocking position. The projecting portion 56 formed on the movable member 52 of the full closure unlocking lever 50 is disposed in an inside of the locking groove 73. The projecting portion 56 formed on the movable member 52 of the full closure unlocking lever 50 is formed so as to be in abutment with or in close proximity to an inner circumferential surface 73*a* of the locking groove 73 of the child lock lever 70 when the child lock lever 70 is staying in the child unlocking position.

Figure 6:
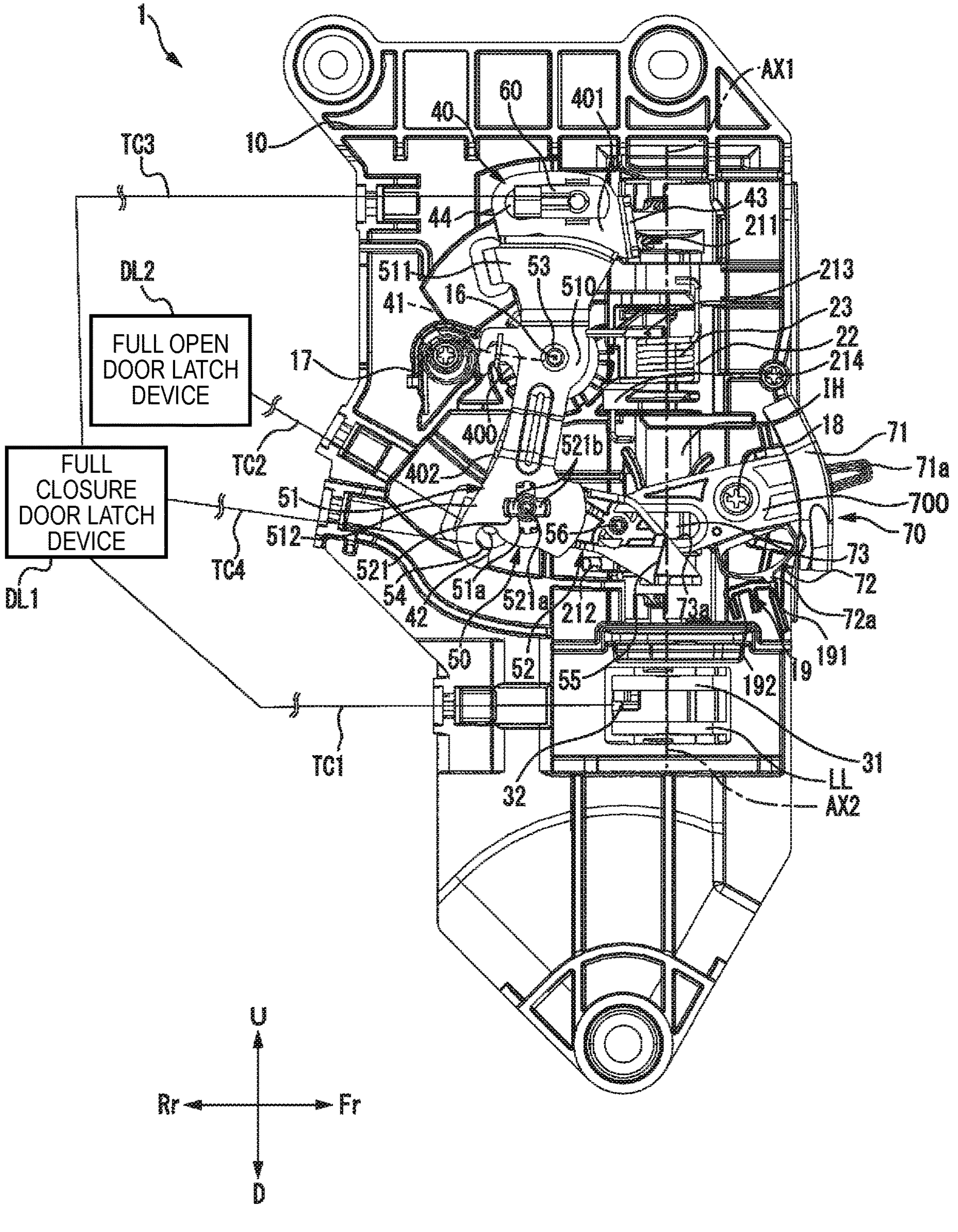
FIG. 6 is a front view of the main part of the vehicle door operation device with the inside handle activated for a closing operation.
Figure 7:
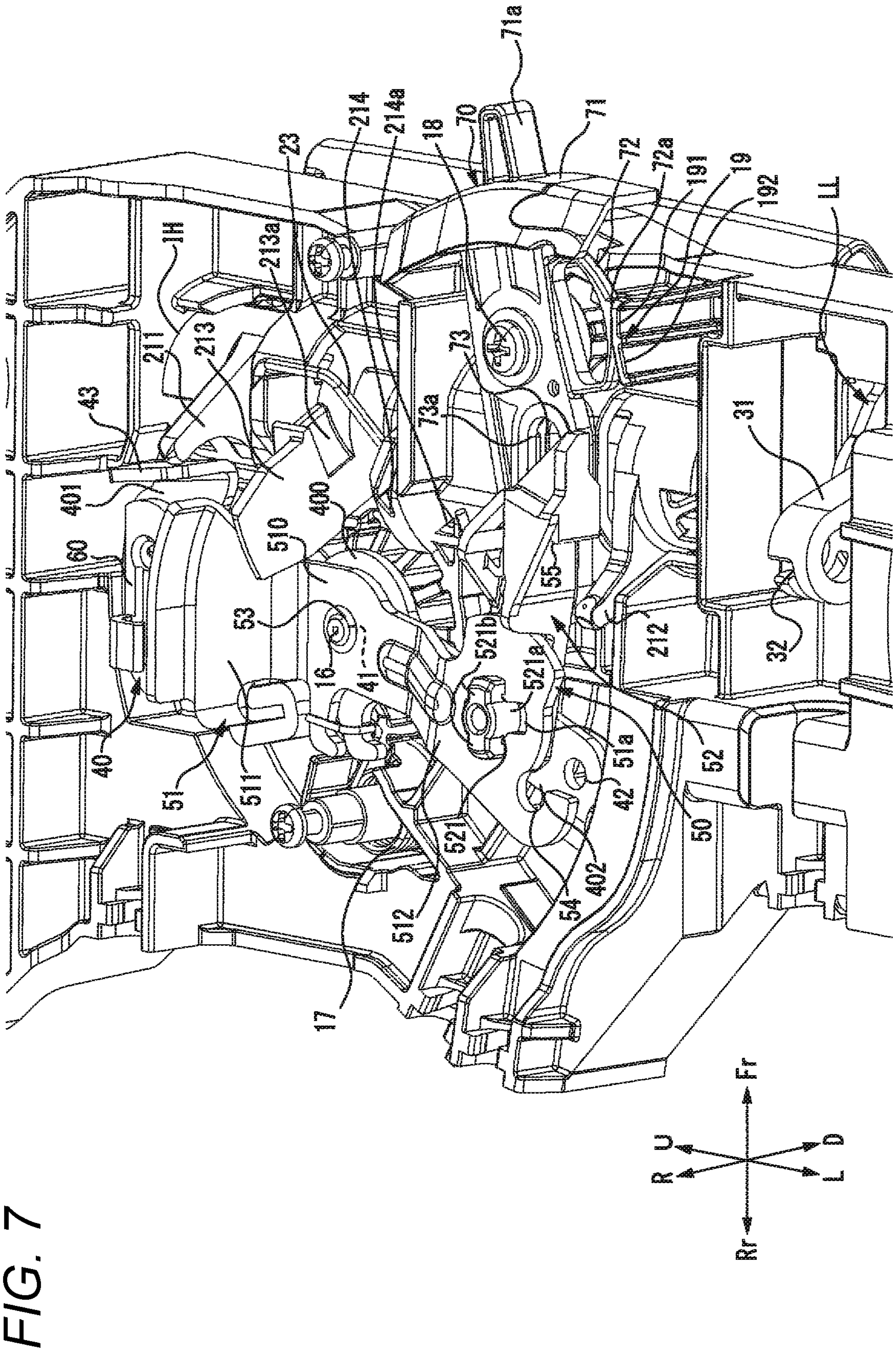
FIG. 7 is a perspective view of the main part of the vehicle door operation device shown in FIG. 6 as seen obliquely from below.

Operation of Vehicle Door Operation Device Resulting from Closing Operation by Inside Handle As shown in FIGS. 6 and 7, with the door D left in the full open locking state, when the inside handle IH rotates clockwise about the inside handle axis AX1 as seen from above as a result of a closing operation performed by the occupant inside the passenger compartment, the first projecting portion 211 of the inside handle IH is brought into abutment with the abutment surface 43 of the full open unlocking lever 40 and then displaces the abutment surface 43 of the full open unlocking lever 40 to the rear. Then, since the upper portion 401 of the full open unlocking lever 40 is displaced to the rear, the full open unlocking lever 40 rotates counterclockwise about the lever shaft 16 in the side view as seen from the outer side. When the full open unlocking lever 40 rotates counterclockwise about the lever shaft 16 in the side view as seen from the outer side, the connecting portion 42 provided in the lower portion 402 of the full open unlocking lever 40 is displaced to the front, whereby the one end portion of the operation force transmitting member TC2, which is connected to the connecting portion 42, is pulled to the front. Then, when the one end portion of the operation force transmitting member TC2 is pulled to the front, the full open release mechanism portion of the full open door latch device DL2, to which the other end portion of the operation force transmitting member TC2 is connected, is activated, whereby the meshing engagement of the full open latch mechanism portion of the full open door latch device DL2 with the full open striker of the door D is released. As a result, the full open locking state in which the door D is held in the full open position is released, whereby the door D can be closed. In this way, when the inside handle IH rotates clockwise about the inside handle axis AX1 as seen from above as a result of being activated for the closing operation, the first projecting portion 211 is brought into abutment with the abutment surface 43 of the full open unlocking lever 40, thereby causing the full open unlocking lever 40 to operate.

Then, the full open unlocking lever 40 can transmit the closing operation of the inside handle IH to the full open door latch device DL2.

As a result, with the vehicle door operation device 1, since the closing operation of the inside handle IH can be transmitted to the full open unlocking lever 40 without providing a transmitting member such as a rod or the like for transmitting the closing operation of the inside handle IH to the full open unlocking lever 40, the number of components involved in the vehicle door operation device 1 can be reduced, whereby the vehicle door operation device 1 can be made smaller in size.

On the other hand, as described above, the input member 60 is provided in such a manner as to be positioned at the rear end of the locking portion 44 when the full open unlocking lever 40 is staying in its neutral position. Consequently, when the inside handle IH performs the closing operation, the first projecting portion 211 of the inside handle IH is brought into abutment with the abutment surface 43 of the full open unlocking lever 40. Then, when the full open unlocking lever 40 is caused to rotate counterclockwise about the lever shaft 16 in the side view as seen from the outer side, the input member 60 moves to the front relative to the full open unlocking lever 40 in the inside of the locking portion 44 of the arc-like elongate hole shape, and the position in the vehicle door operation device 1 does not change.

Consequently, even though the full open unlocking lever 40 is activated to operate as a result of the closing operation of the inside handle IH, since the input member 60 does not change its position in the vehicle door operation device 1, the operation of the inside handle IH does not impose any influence on the outside handle OH and the other devices that are coupled to the outside handle OH. As a result, the closing operation of the inside handle IH and the operation of the outside handle OH can be transmitted to the full open door latch device DL2 by the single full open unlocking lever 40 without deteriorating the durability of the other devices (for example, the operation force transmitting member TC3 and the full closure door latch device DL1) that are driven by the vehicle door operation device 1.

Even though the inside handle IH rotates counterclockwise about the inside handle axis AX1 as seen from above as a result of an opening operation being performed by the occupant inside the passenger compartment, since the first projecting portion 211 is not brought into contact with the full open unlocking lever 40, the full open unlocking lever 40 is left inoperable.

The full open unlocking lever 40 is disposed in a position where the full open unlocking lever 40 overlaps the inside handle IH at least partially in the side view as seen from the outer side when the full open unlocking lever 40 is placed in its neutral position. More specifically, the full open unlocking lever 40 is disposed in a position where the abutment surface 43 overlaps the inside handle IH in the side view as seen from the outer side when the full open unlocking lever 40 is placed in the neutral position.

As a result, the dimensions of the vehicle door operation device 1 can be reduced in the front-rear and up-down directions, and the vehicle door operation device 1 can be made smaller in size accordingly.

Figure 8:
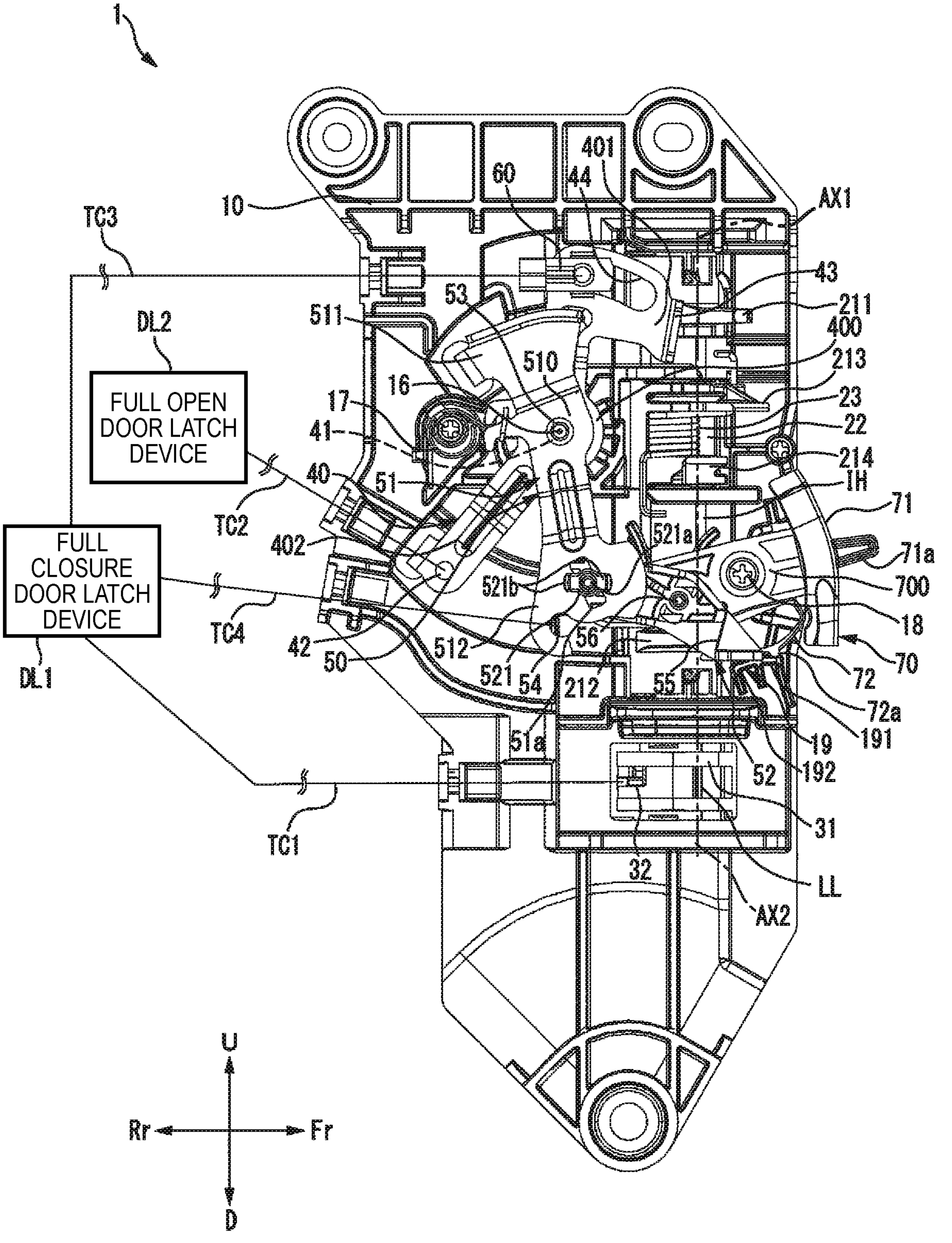
FIG. 8 is a front view of the main part of the vehicle door operation device with the inside handle activated for an opening operation when a child lock lever remains in a child unlocking position.
Figure 9:
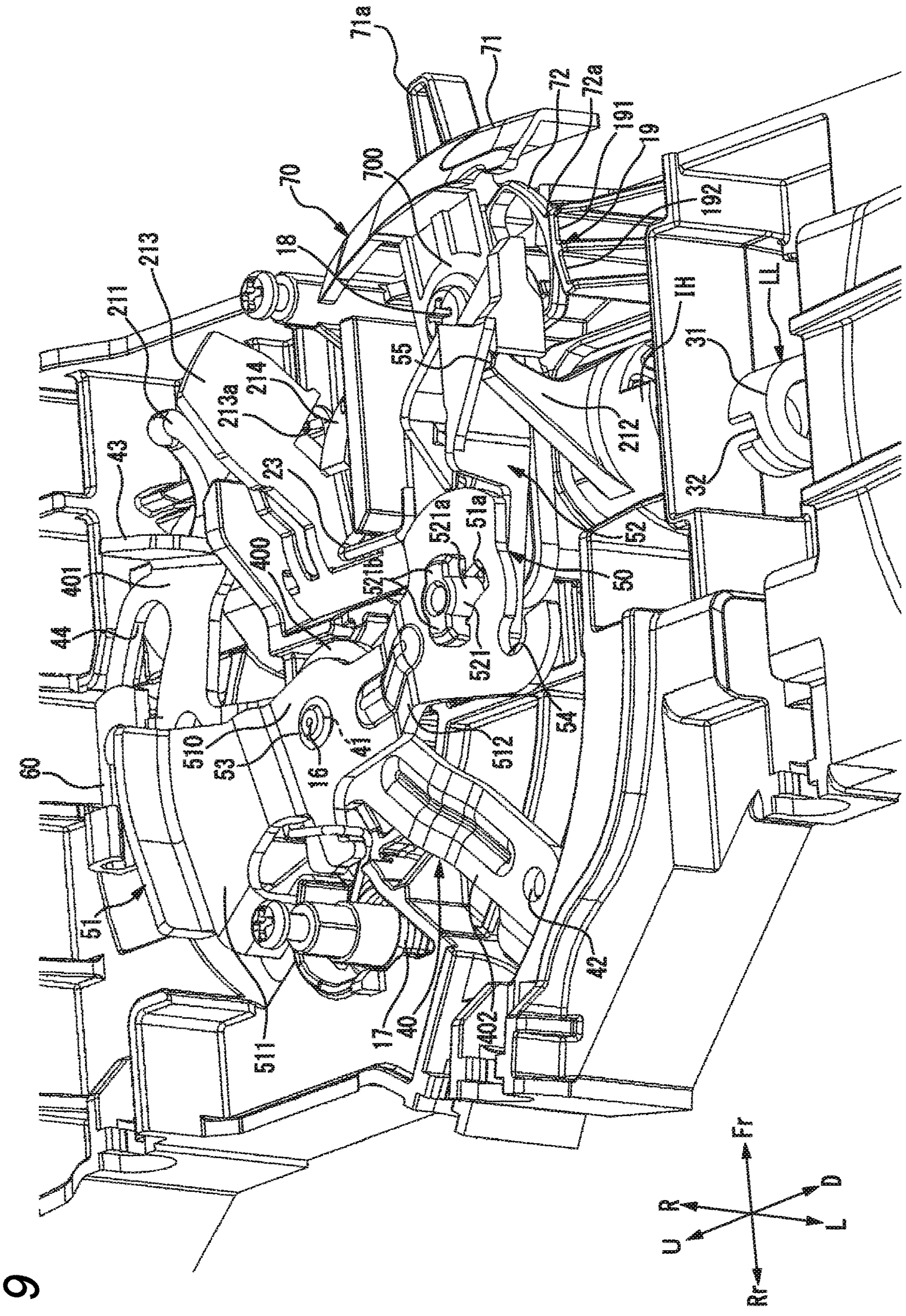
FIG. 9 is a perspective view of the main part of the vehicle door operation device shown in FIG. 8 as seen obliquely from below.

Operation of Vehicle Door Operation Device Resulting from Opening Operation by Inside Handle with Child Lock Lever Staying in Child Unlocking Position As shown in FIGS. 8 and 9, with the child lock lever 70 staying in the child unlocking position and the door D staying in the full closure state, when the inside handle IH rotates counterclockwise about the inside handle axis AX1 as seen from above as a result of the occupant inside the passenger compartment performing the opening operation on the inside handle IH, the second projecting portion 212 of the inside handle IH is brought into abutment with the abutment surface 55 of the movable member 52 of the full closure unlocking lever 50, whereby a load in a front direction is applied to the abutment surface 55 of the movable member 52.

With the child lock lever 70 staying in the child unlocking position, since the locking groove 73 in the child lock lever 70 extends substantially horizontally in the front-rear direction, when the load in the front direction is applied to the abutment surface 55 of the movable member 52, the movable member 52 is displaced to the front with the projecting portion 56 sliding to the front in an inside of the locking groove 73 of the child lock lever 70. In this way, with the child lock lever 70 staying in the child unlocking position, the movable member 52 is displaced to the front without being interrupted by the child lock lever 70.

When the movable member 52 is displaced to the front, the lower end portion of the lever main body 51 of the full closure unlocking lever 50 is pulled to the front via the locking portion 521. Then, since the lower end portion of the lever main body 51 is displaced to the front, the lever main body 51 rotates counterclockwise about the lever shaft 16 in the side view as seen from the outer side. When the lever main body 51 rotates counterclockwise about the lever shaft 16 in the side view as seen from the outer side, the connecting portion 54 provided in the lever main body 51 is also displaced to the front, whereby the one end portion of the operation transmitting member TC4, which is connected to the connecting portion 54, is pulled to the front. When the one end portion of the operation force transmitting member TC4 is pulled to the front, the full closure release mechanism portion of the full closure door latch device DL1, to which the other end portion of the operation force transmitting member TC4 is connected, is activated to operate, whereby the meshing engagement of the full closure latch mechanism portion of the full closure door latch device DL1 with the full closure striker of the door D is released. As a result, the door D is released from the full closure locking state where the door D is held in the full closure position, whereby the door D can be opened.

In this way, with the child lock lever 70 staying in the child unlocking position, the full closure unlocking lever 50 is put in the child unlocking state where the opening operation of the inside handle IH is transmitted to the full closure unlocking lever 50. Then, with the child lock lever 70 staying in the child unlocking position, when the inside handle IH rotates counterclockwise about the inside handle axis AX1 as seen from above as a result of the inside handle IH being activated for the opening operation, the second projecting portion 212 is brought into abutment with the abutment surface 55 of the movable member 52 of the full closure unlocking lever 50 to thereby displace the movable member 52, whereby the lever main body 51 is displaced accordingly as a result of the movable member 52 being so displaced, thereby enabling the full closure unlocking lever 50 to be activated to operate.

As a result, with the vehicle door operation device 1, since the opening operation of the inside handle IH can be transmitted to the full closure unlocking lever 50 without providing a transmitting member such as a rod or the like for transmitting the opening operation of the inside handle IH to the full closure unlocking lever 50, the number of components involved in the vehicle door operation device 1 can be reduced, whereby the vehicle door operation device 1 can be made smaller in size.

Even though the inside handle IH is caused to rotate clockwise about the inside handle axis AX1 as seen from above as a result of the occupant inside the passenger compartment performing the closing operation on the inside handle IH, since the second projecting portion 212 is not brought into contact with the full closure unlocking lever 50, the full closure unlocking lever 50 is left inoperable.

When staying in its neutral position, the full closure unlocking lever 50 is disposed in a position where the full closure unlocking lever 50 overlaps the inside handle IH at least partially in the side view as seen from the outer side. More specifically, when staying in its neutral position, the full closure unlocking lever 50 is disposed in a position where the abutment surface 55 of the movable member 52 of the full closure unlocking lever 50 overlaps the inside handle IH in the side view as seen from the outer side.

As a result, the dimensions of the vehicle door operation device 1 can be reduced in the front-rear and up-down directions, and the vehicle door operation device 1 can be made smaller in size accordingly.

Figure 10:
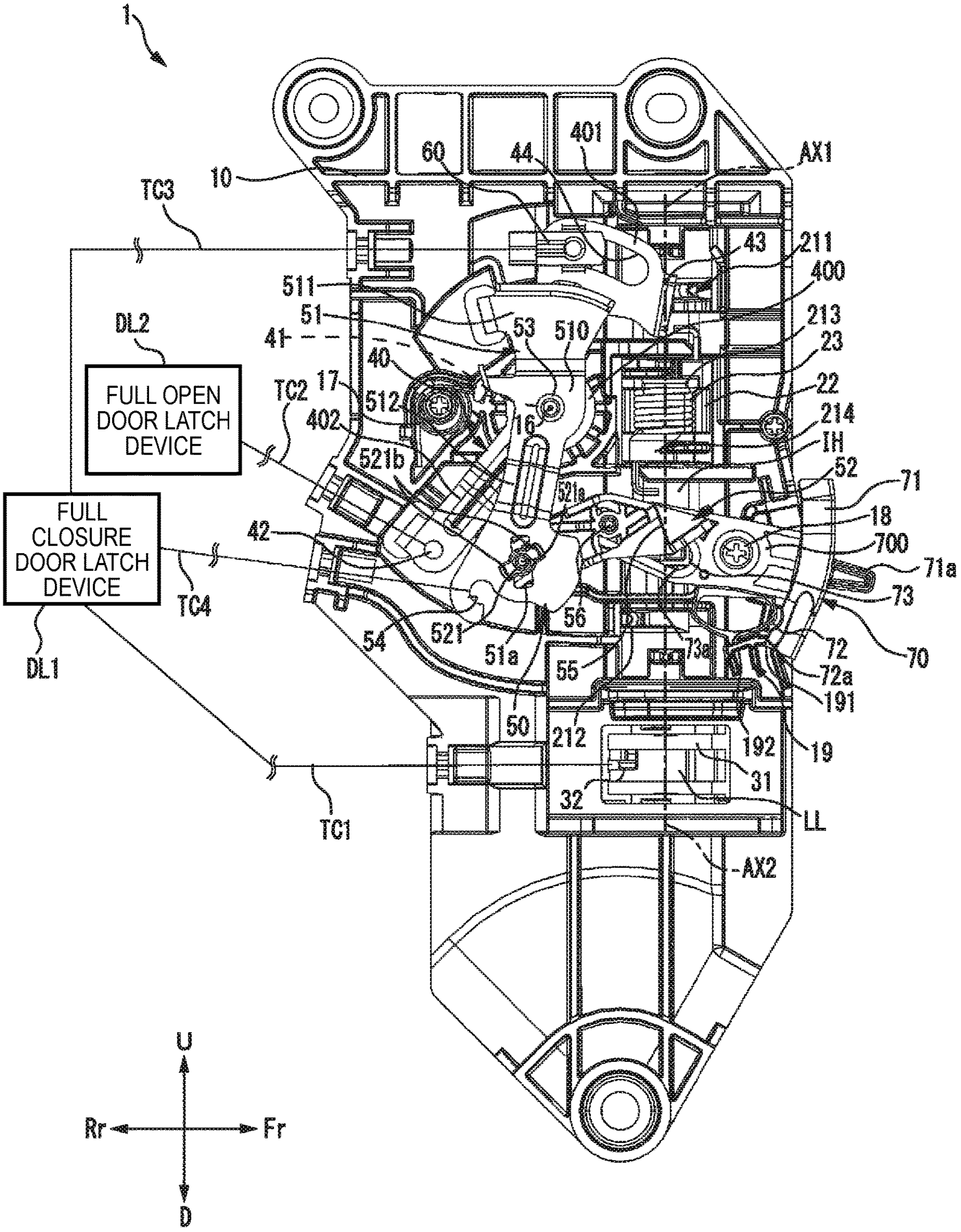
FIG. 10 is a front view of the main part of the vehicle door operation device with the inside handle activated for an opening operation when the child lock lever remains in a child locking position.

Operation of Vehicle Door Operation Device with Child Lock Lever Displaced from Child Unlocking Position to Child Locking Position As shown in FIG. 10, when the operating portion 71*a* of the child lock lever 70 is pulled downwards from the child unlocking position, the annular portion 72 deforms in such a manner as to collapse in the side view as seen from the outer side, and the engagement projection 72*a* slides to the rear while it is kept in abutment with the upper surface of the engagement wall portion 19 of the base plate 10, whereby the child lock lever 70 rotates clockwise about the bolt 18 in the side view as seen from the outer side. Then, when the engagement projection 72*a* slides to the rear while it is kept in abutment with the upper surface of the rear side portion 192 of the engagement wall portion 19 of the base plate 10, the deformed annular portion 72 is gradually restored to its original shape. Then, when the child lock lever 70 arrives at the child locking position, the shape of the annular portion 72 is restored to the original shape, and the engagement projection 72*a* of the child lock lever 70 is brought into engagement with the engagement wall portion 19 of the base plate 10 in the vicinity of the rear end of the upper surface of the rear side portion 192.

On the other hand, when the operating portion 71*a* of the child lock lever 70 is pulled upwards from the child locking position, the annular portion 72 deforms in such a manner as to collapse in the side view as seen from the outer side, and the engagement projection 72*a* slides to the front while it is kept in abutment with the upper surface of the engagement wall portion 19 of the base plate 10, whereby the child lock lever 70 rotates counterclockwise about the bolt 18 in the side view as seen from the outer side. Then, when the engagement projection 72*a* slides to the front while it is kept in abutment with the upper surface of the front side portion 191 of the engagement wall portion 19 of the base plate 10, the deformed annular portion 72 is gradually restored to the original shape. Then, when the child lock lever 70 arrives at the child unlocking position, the shape of the annular portion 72 is restored to the original shape, whereby the engagement projection 72*a* of the child lock lever 70 is brought into engagement with the engagement wall portion 19 of the base plate 10 in the vicinity of the front end of the upper surface of the front side portion 191.

In this way, when the operating portion 71*a* of the child lock lever 70 is pulled downwards from the child unlocking position, the annular portion 72 deforms in such a manner as to collapse in the side view as seen from the outer side and thereafter restores its original shape, whereby the child lock lever 70 arrives at the child locking position. Consequently, when the child lock lever 70 is staying in the child locking position, as long as a great load in an upward direction is not exerted on the operating portion 71*a*, the child lock lever 70 is held in the child locking position by a drag generated in the annular portion 72.

Similarly, when the operating portion 71*a* of the child lock lever 70 is pulled upwards from the child locking position, the annular portion 72 deforms in such a manner as to collapse in the side view as seen from the outer side and thereafter restores its original shape, whereupon the child lock lever 70 arrives at the child unlocking position. Consequently, when the child lock lever 70 is staying in the child unlocking position, as long as a great load in a downward direction is not exerted on the operating portion 71*a*, the child lock lever 70 is held in the child unlocking position by a drag generated in the annular portion 72.

When the operating portion 71*a* of the child lock lever 70 is pulled downwards from the child unlocking position, since the child lock lever 70 rotates clockwise about the bolt 18 in the side view as seen from the outer side, the rear end portion of the main body portion 700 is displaced upwards. Then, since the projecting portion 56 of the movable member 52 of the full closure unlocking lever 50 is disposed in the inside of the locking groove 73 in the child lock lever 70, the lower side surface of the inner circumferential surface 73*a* of the locking groove 73 is brought into abutment with the projecting portion 56 of the movable member 52, whereby the child lock lever 70 displaces the movable member 52 in a direction in which the projecting portion 56 of the movable member 52 is displaced upwards. As a result, the movable member 52 rotates counterclockwise about the cylindrical portion 521*a* in the side view as seen from the outer side. As this occurs, there may be a case in which the movable member 52 rotates counterclockwise about the cylindrical portion 521*a* in the side view as seen from the outer side and the cylindrical portion 521*a* slides in the inside of the locking hole 51*a* in the lever main body 51.

When the movable member 52 rotates counterclockwise about the cylindrical portion 521*a* in the side view as seen from the outer side, the abutment surface 55 formed at the front end portion of the movable member 52 is displaced upwards. Then, when the child lock lever 70 is staying in the child locking position, the abutment surface 55 formed at the front end portion of the movable member 52 is positioned above the second projecting portion 212 of the inside handle IH. In this way, when the child lock lever 70 is displaced into the child locking position, the child lock lever 70 displaces the movable member 52 to the position where the movable member 52 is not brought into abutment with the second projecting portion 212 even though the inside handle IH rotates counterclockwise about the inside handle axis AX1 as seen from above as a result of the inside handle IH being activated for the opening operation.

Consequently, with the child lock lever 70 staying in the child locking position and the door D staying in the full closure locking state, even though the inside handle IH rotates counterclockwise about the inside handle axis AX1 as seen from above as a result of the occupant in the passenger compartment performing the opening operation, the second projecting portion 212 of the inside handle IH is not brought into abutment with the abutment surface 55 of the movable member 52 of the full closure unlocking lever 50. Then, even though the inside handle IH rotates counterclockwise about the inside handle axis AX1 as seen from above as a result of the occupant in the passenger compartment performing the opening operation on the inside handle IH, the movable member 52 and the lever main body 51 of the full closure unlocking lever 50 are not displaced. In this way, when the child lock lever 70 is staying in the child locking position, the full closure unlocking lever 50 is put in the child locking state in which the opening operation of the inside handle IH is not transmitted thereto. Then, when the child lock lever 70 is staying in the child locking position, even though the inside handle IH rotates counterclockwise about the inside handle axis AX1 as seen from above as a result of the opening operation of the inside handle IH, the full closure unlocking lever 50 is left inoperable, and the one end portion of the operation force transmitting member TC4, which is connected to the connecting portion 54 provided in the lever main body 51, is not pulled to the front. Therefore, the full closure release mechanism portion of the full closure door latch device DL1, to which the other end portion of the operation force transmitting member TC4 is connected, is left inoperable, and the door D is held in the full closure locking state in which the door D is held in the full closure position, whereby the door D cannot be opened. As a result, when the child lock lever 70 is staying in the child locking position, since the door D is held in the full closure locking state in which the door D is held in the full closure position and cannot be opened even though the inside handle IH is erroneously performed for the opening operation by a child staying in the inside of the passenger compartment, the safeness of the vehicle V is improved.

In addition, when the child lock lever 70 is displaced from the child unlocking position to the child locking position, the child lock lever 70 displaces the movable member 52 of the full closure unlocking lever 50, but the lever main body 51 is not displaced. Similarly, also when the child lock lever 70 is displaced from the child locking position to the child unlocking position, the child lock lever 70 displaces the movable member 52 of the full closure unlocking lever 50, but the lever main body 51 is not displaced. Consequently, when the child lock lever 70 is displaced from the child unlocking position to the child locking position, the full closure unlocking lever 50 can be put in the child locking state without displacing the lever main body 51 to which the operation force transmitting member TC4 is connected. As a result, since the operation of the child lock lever 70 imposes no influence on the full closure door latch device DL1, the reduction in durability of the other devices (for example, the full closure door latch device DL1) that are driven by the vehicle door operation device 1 can be prevented with the simple structure.

Further, since the child lock lever 70 comes into abutment with the movable member 52 of the full closure unlocking lever 50 so as to switch the states of the full closure unlocking lever 50 between the child unlocking state and the child locking state, with the vehicle door operation device 1, the full closure unlocking lever 50 can be switched between the child unlocking state and the child locking state without providing a transmitting member such as a rod or the like for transmitting the operation of the child lock lever 70 to the full closure unlocking lever 50. As a result, the number of components involved in the vehicle door operation device 1 can be reduced, thereby making it possible to reduce the size of the door operation device 1 smaller accordingly.

Furthermore, the child lock lever 70 is disposed in the position where the child lock lever 70 overlaps the inside handle IH at least partially in the side view as seen from the outer side. More specifically, when the child lock lever 70 is staying in the child unlocking position, the main body portion 700 extends across the inside handle IH in the front-rear direction in the side view as seen from the outer side.

As a result, since the dimensions of the vehicle door operation device 1 can be reduced in the front-rear and up-down directions, the size thereof can be made much smaller.

Additionally, the first projecting portion 211 of the inside handle IH is provided at the upper end side of the inside handle IH in an axial direction of the inside handle axis AX1, and the second projecting portion 212 of the inside handle IH is provided at the lower end side of the inside handle IH in the axial direction of the inside handle axis AX1. Thus, the first projecting portion 211 and the second projecting portion 212 of the inside handle IH can be provided farther apart from each other. As a result, the full open unlocking lever 40 and the full closure unlocking lever 50 can be disposed efficiently in terms of space while disposing the full open unlocking lever 40 in such a manner that the full open unlocking lever 40 is brought into abutment with the first projecting portion 211 as a result of the closing operation of the inside handle IH and disposing the full closure unlocking lever 50 in such a manner that the full closure unlocking lever 50 is brought into abutment with the second projecting portion 212 as a result of the opening operation of the inside handle IH, whereby the size of the vehicle door operation device 1 can be made much smaller.

{Inside Handle Operation Detection Unit}

Figure 11:
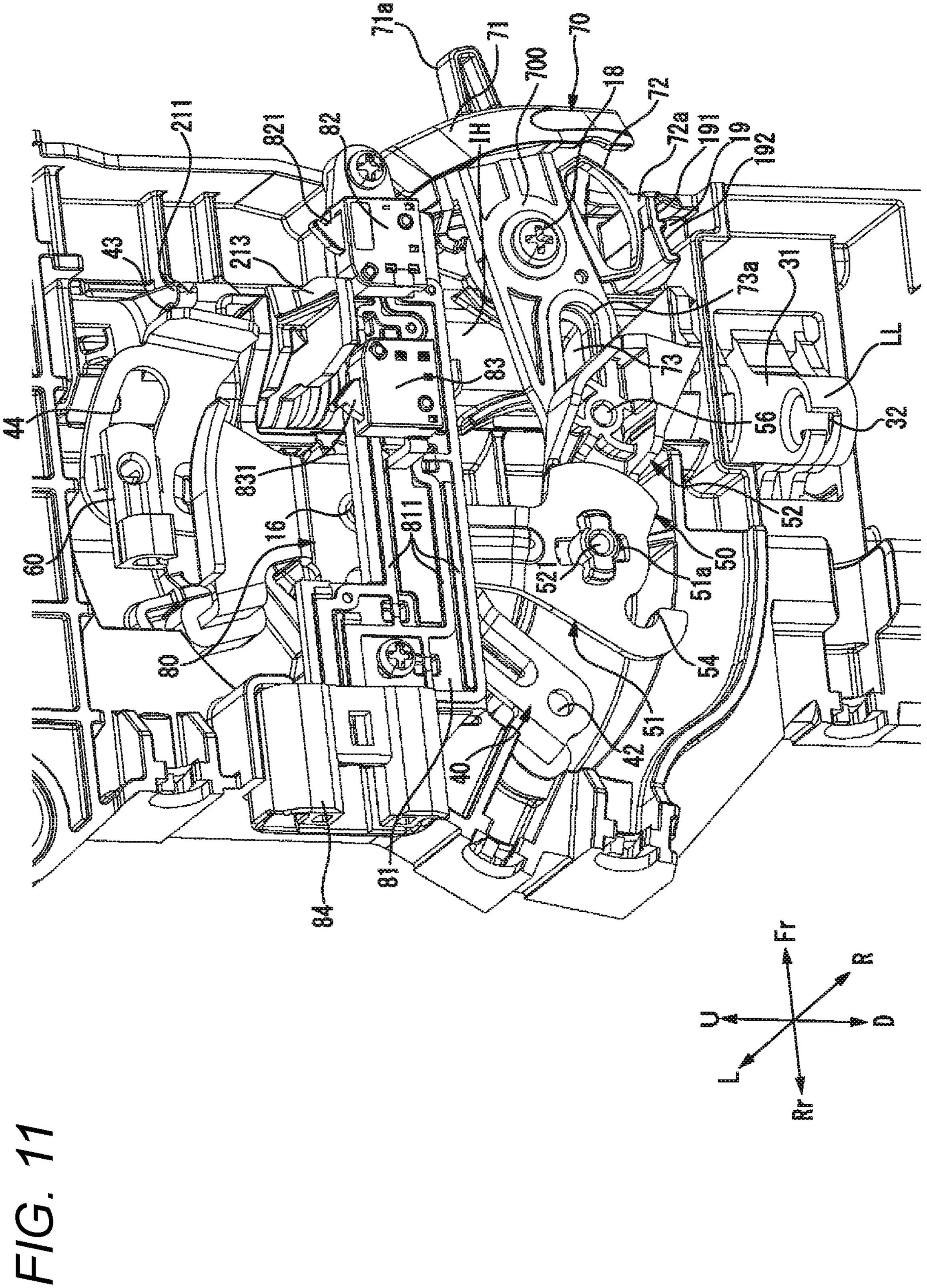
FIG. 11 is a perspective view of the main part of the vehicle door operation device as seen obliquely from above with the inside handle operation detection unit (excluding a cover portion) attached.

As shown in FIG. 11, the vehicle door operation device 1 includes further an inside handle operation detection unit 80 that is disposed on the side of the base plate 10 which faces the outer side. The inside handle operation detection unit 80 is disposed in such a manner as to extend in the front-rear direction below a third projecting portion 213 of the inside handle IH. The inside handle operation detection unit 80 includes a base portion 81, an opening operation detection unit 82 and a closing operation detection unit 83 which are fixed to the base portion 81, and a connector portion 84 that is provided at a rear end portion of the base portion 81. The inside handle operation detection unit 80 includes a cover portion (not shown) for covering surfaces of the base portion 81, the opening operation detection unit 82, and the closing operation detection unit 83 which face the outer side. A conductor circuit 811 is formed on the base portion 81 so as to connect electrically the opening operation detection unit 82 and the closing operation detection unit 83 with the connector portion 84. A harness of wires (not shown) connecting to the electric powered door opening and closing device PSD described previously is connected to the connector portion 84, and the opening operation detection unit 82 and the closing operation detection unit 83 are electrically connected with the electric powered door opening and closing device PSD via the conductor circuit 811, the connector portion 84, and the harness of wires.

The opening operation detection unit 82 has an opening operation detecting portion 821. The opening operation detecting portion 821 projects upwards from the base portion 81 ahead of the third projecting portion 213 of the inside handle IH and is disposed so as to face a front surface of the third projecting portion 213 of the inside handle IH. The opening operation detecting portion 821 can be displaced in such a manner as to sink downwards and is biased upwards by a biasing means such as a spring or the like.

When the inside handle IH rotates counterclockwise about the inside handle axis AX1 as seen from above as a result of the occupant in the passenger compartment performing an opening operation on the inside handle IH, the third projecting portion 213 of the inside handle IH is brought into abutment with the opening operation detecting portion 821 of the opening operation detection unit 82 to thereby depress the opening operation detecting portion 821 downwards. When the opening operation detecting portion 821 is depressed so as to be displaced downwards by the third projecting portion 213 of the inside handle IH, the opening operation detection unit 82 outputs a signal indicating that the inside handle IH has been activated for the opening operation to the electric powered door opening and closing device PSD via the conductor circuit 811, the connector portion 84, and the harness of wires. The electric powered door opening and closing device PSD can open the door D electrically based on the signal output from the opening operation detection unit 82 to indicate that the inside handle IH has been activated for the opening operation.

When the occupant in the passenger compartment finishes the opening operation, the inside handle IH returns to the neutral position, and the third projecting portion 213 of the inside handle IH moves away from the opening operation detecting portion 821, the opening operation detecting portion 821 is caused to return to its original position by the biasing means that biases the opening operation detecting portion 821 upwards.

The closing operation detection unit 83 has a closing operation detecting portion 831. The closing operation detecting portion 831 projects upwards from the base portion 81 behind the third projecting portion 213 of the inside handle IH and is disposed so as to face a rear surface of the third projecting portion 213 of the inside handle IH. The closing operation detecting portion 831 can be displaced so as to sink downwards and is biased upwards by a biasing means such as a spring or the like.

When the inside handle IH rotates clockwise about the inside handle axis AX1 as seen from above as a result of the occupant in the passenger compartment performing a closing operation on the inside handle IH, the third projecting portion 213 of the inside handle IH is brought into abutment with the closing operation detecting portion 831 of the closing operation detection unit 83 to thereby depress the closing operation detecting portion 831 downwards. When the closing operation detecting portion 831 is depressed so as to be displaced downwards by the third projecting portion 213 of the inside handle IH, the closing operation detection unit 83 outputs a signal indicating that the inside handle IH has been activated for the closing operation to the electric powered door opening and closing device PSD via the conductor circuit 811, the connector portion 84, and the harness of wires. The electric powered door opening and closing device PSD can close the door D electrically based on the signal which is output from the closing operation detection unit 83 and indicates that the inside handle IH has been subjected to the opening operation.

When the occupant in the passenger compartment finishes the closing operation, the inside handle IH returns to the neutral position, and the third projecting portion 213 of the inside handle IH moves away from the closing operation detecting portion 831, the closing operation detecting portion 831 is caused to return to its original position by the biasing means that biases the closing operation detecting portion 831 upwards.

Thus, while the illustrative embodiment of the disclosure has been described heretofore while referring to the accompanying drawings, needless to say, the disclosure is not limited to the illustrative embodiment in any way. It is clear that those skilled in the art to which the invention pertains can arrive at various types of alterations or modifications without departing from what is described to be claimed in claims of the invention, and it is natural to recognize that those resulting alterations or modifications belong to the technical scope of the invention. In addition, the constituent elements described in the illustrative embodiment may arbitrarily be combined together without departing from the scope of the invention.

As discussed above, the disclosure may provide at least the following illustrative, non-limiting aspects. In other words, at least the following matters are described in the specification. The elements described in the illustrative embodiment are parenthesized as examples corresponding to elements to be described as below. However, those are not limited to the parenthesized elements in any way.

(1) A vehicle door operation device (the vehicle door operation device 1) including:

an inside handle (the inside handle IH) disposed on an inner side of a door (the door D) of a vehicle (the vehicle V) and is rotatable about an inside handle axis (the inside handle axis AX1), the inside handle being rotatable in a first direction (the clockwise direction as seen from above) in accordance with a closing operation and being rotatable in a second direction (the counterclockwise direction as seen from above) in accordance with an opening operation;

a full open unlocking lever (the full open unlocking lever 40) configured to transmit the closing operation of the inside handle to a full open door latch device (the full open door latch device DL2), the full open door latch device being configured to hold the door in a full open position; and a full closure unlocking lever (the full closure unlocking lever 50) configured to transmit the opening operation of the inside handle to a full closure door latch device (the full closure door latch device DL1), the full closure door latch device being configured to hold the door in a full closure position, wherein the inside handle includes a first projecting portion (the first projecting portion 211) and a second projecting portion (the second projecting portion 212) which project radially outwards of the inside handle axis, wherein when the inside handle rotates in the first direction in accordance with the closing operation, the first projecting portion is brought into abutment with the full open unlocking lever to enable the full open unlocking lever to operate, and wherein when the inside handle rotates in the second direction in accordance with the opening operation, the second projecting portion is brought into abutment with the full closure unlocking lever to enable the full closure unlocking lever to operate.

According to the aspect (1), when the inside handle rotates in the first direction in accordance with the closing operation, the first projecting portion is brought into abutment with the full open unlocking lever to thereby enable the full open unlocking lever to operate, and when the inside handle rotates in the second direction in accordance with the opening operation being performed thereon, the second projecting portion is brought into abutment with the full closure unlocking lever to thereby enable the full closure unlocking lever to operate. Thus, the closing operation of the inside handle can be transmitted to the full open unlocking lever without providing a transmitting member such as a rod or the like for transmitting the closing operation of the inside handle to the full open unlocking lever. In addition, the opening operation of the inside handle can be transmitted to the full closure unlocking lever without providing a transmitting member such as a rod or the like for transmitting the opening operation of the inside handle to the full closure unlocking lever. As a result, with the vehicle door operation device, the number of components involved therein can be reduced, whereby the vehicle door operation device can be made smaller in size.

(2) The vehicle door operation device according to (1),
wherein the full open unlocking lever is disposed in a position where the full open unlocking lever overlaps the inside handle at least partially in a side view of the vehicle, and
wherein the full closure unlocking lever is disposed in a position where the full closure unlocking lever overlaps the inside handle at least partially in the side view of the vehicle.

According to the aspect (2), the full open unlocking lever is disposed in the position where the full open unlocking lever overlaps the inside handle at least partially in the side view of the vehicle, and the full closure unlocking lever is disposed in the position where the full closure unlocking lever overlaps the inside handle at least partially in the side view of the vehicle. Thus, dimensions of the vehicle door operation device can be reduced in the front-rear and up-down directions, whereby the vehicle door operation device can be made much smaller in size.

(3) The vehicle door operation device according to (1) or (2), further including:
a child lock lever (the child lock lever 70) displaceable to a child unlocking position and a child locking position,
wherein in a case the child lock lever is in the child unlocking position, the full closure unlocking lever is put in a child unlocking state in which the opening operation of the inside handle is transmitted thereto,
wherein in a case the child lock lever is in the child locking position, the full closure unlocking lever is put in a child locking state in which the opening operation of the inside handle is not transmitted thereto,
wherein the child lock lever is configured to be brought into abutment with the full closure unlocking lever to switch the full closure unlocking lever between the child unlocking state and the child locking state, and
wherein the child lock lever is disposed in a position where the child lock lever overlaps the inside handle at least partially in the side view of the vehicle.

According to the aspect (3), the child lock lever is brought into abutment with the full closure unlocking lever to thereby switch the full closure unlocking lever between the child unlocking state and the child locking state. Thus, with the vehicle door operation device, the full closure unlocking lever can be switched between the child unlocking state and the child locking state without providing a transmitting member such as a rod or the like for transmitting the operation of the child lock lever to the full closure unlocking lever. As a result, the number of components involved in the vehicle door operation device can be reduced, whereby the vehicle door operation device can be made smaller in size. Further, the child lock lever overlaps the inside handle at least partially in the side view of the vehicle. Thus, dimensions of the vehicle door operation device can be reduced in the front-rear and up-down directions, whereby the vehicle door operation device can be made much smaller in size.

(4) The vehicle door operation device according to (3),
wherein the full closure unlocking lever includes a lever main body (the lever main body 51) to which an operation force transmitting member (the operation force transmitting member TC4) is connected, the operation force transmitting member being configured to transmit an operation of the full closure unlocking lever to the full closure door latch device and a movable member (the movable member 52) configured to be brought into engagement with the lever main body in such a manner as to move relatively,
wherein the movable member includes an inside handle abutment portion (the abutment surface 55), the second projecting portion being configured to be brought into abutment with the inside handle abutment portion, and a child lock lever abutment portion (the projecting portion 56), the child lock lever being configured to be brought into abutment with the child lock lever abutment portion,
wherein when the inside handle rotates in the second direction in accordance with the opening operation with the child lock lever being in the child unlocking position, the second projecting portion is brought into abutment with the inside handle abutment portion of the movable member to displace the movable member, and the lever main body is displaced in accordance with the displacement of the movable member, whereby the full closure unlocking lever is enabled to operate, and
wherein when the child lock lever is displaced into the child locking position, the child lock lever is brought into abutment with the child lock lever abutment portion of the movable member to displace the movable member into a position where the second projecting portion is not brought into abutment therewith even though the inside handle rotates in the second direction in accordance with the opening operation.

According to the aspect (4), the full closure unlocking lever includes the lever main body to which the operation force transmitting member is connected and the movable member which is brought into engagement with the lever main body in such a manner as to move relatively. When the child lock lever is in the child locking position, the child lock lever displaces the movable member into the position where the second projecting portion is not brought into abutment therewith even though the inside handle rotates in the second direction in accordance with the opening operation, whereby the full closure unlocking lever can be put in the child locking state without displacing the lever main body to which the operation force transmitting member is connected. As a result, since the operation of the child lock lever does not impose any influence on the full closure door latch device, the reduction in durability of the other devices driven by the vehicle door operation device can be prevented with the simple structure.

(5) The vehicle door operation device according to any one of (1) to (4),
wherein the first projecting portion is provided at a first end side (the upper end side) of the inside handle in an axial direction of the inside handle axis, and
wherein the second projecting portion is provided at a second end side (the lower end side) of the inside handle in the axial direction, the second end side being opposite to the first end side of the inside handle.

According to the aspect (5), the first projecting portion of the inside handle is provided at the first end side of the inside handle in the axial direction of the inside handle axis, and the second projecting portion of the inside handle is provided at the second end side of the inside handle in the axial direction of the inside handle axis AX1. Thus, the first projecting portion and the second projecting portion of the inside handle can be provided farther apart from each other. As a result, the full closure unlocking lever and the full open unlocking lever can be disposed efficiently in terms of space while disposing the full open unlocking lever so as to be brought into abutment with the first projecting portion in accordance with the closing operation of the inside handle and disposing the full closure unlocking lever so as to be brought into abutment with the second projecting portion in accordance with the opening operation of the inside handle, thereby making it possible to make the vehicle door operation device much smaller in size.

(6) The vehicle door operation device according to any one of (1) to (5), further including:

an input member (the input member 60), an operation of an outside handle (the outside handle OH) disposed on the outer side of the door being input to the input member, wherein a locking portion (the locking portion 44) is formed on the full open unlocking lever, the input member being locked on the locking portion, wherein the locking portion has an elongate hole shape, wherein the input member is locked in such a manner as to slide in an inside of the locking portion so as to move relatively to the full open unlocking lever, wherein the input member is configured to enable the full open unlocking lever to operate when the operation of the outside handle is transmitted to the input member, and wherein when the full open unlocking lever is enabled to operate in accordance with the closing operation of the inside handle, the input member moves relatively to the full open unlocking lever in the inside of the locking portion and does not change its position in the vehicle door operation device.

According to the aspect (6), the vehicle door operation device includes further the input member to which the operation of the outside handle disposed on the outer side of the door is transmitted. When the operation of the outside handle is transmitted to the input member, the input member enables the full open unlocking lever to operate, and when the full open unlocking lever is enabled to operate in accordance with the closing operation of the inside handle, the input member moves relatively to the full open unlocking lever in the inside of the locking portion formed in the full open unlocking lever while not changing the position thereof in the vehicle door operation device. Thus, the operation of the inside handle does not impose any influence on the outside handle and the other devices connected to the outside handle. As a result, the closing operation of the inside handle and the operation of the outside handle can be transmitted to the full open door latch device with the single full open unlocking lever without deteriorating the durability of the other devices driven by the vehicle door operation device.

What is claimed is:

1. A vehicle door operation device comprising:

a base plate;

an inside handle supported by the base plate and disposed on an inner side of a door of a vehicle, the inside handle being rotatable about an inside handle axis extending in an up-down direction, the inside handle being rotatable in a first direction in accordance with a closing operation and being rotatable in a second direction in accordance with an opening operation;

a full open unlocking lever supported by the base plate and configured to transmit the closing operation of the inside handle to a full open door latch device, the full open door latch device being configured to hold the door in a full open position, a full closure unlocking lever supported by the base plate configured to transmit the opening operation of the inside handle to a full closure door latch device, the full closure door latch device being configured to hold the door in a full closure position; and a lever shaft, wherein the inside handle comprises a first projecting portion and a second projecting portion which project radially outwards of the inside handle axis, wherein when the inside handle rotates in the first direction in accordance with the closing operation, the first projecting portion is brought into abutment with the full open unlocking lever to enable the full open unlocking lever to operate, wherein when the inside handle rotates in the second direction in accordance with the opening operation, the second projecting portion is brought into abutment with the full closure unlocking lever to enable the full closure unlocking lever to operate, and wherein the full open unlocking lever and the full closure unlocking lever are supported on the lever shaft in such a manner as to rotate clockwise and counterclockwise independently about the lever shaft.

2. The vehicle door operation device according to claim 1, wherein the full open unlocking lever is disposed in a position where the full open unlocking lever overlaps the inside handle at least partially in a side view of the vehicle, and wherein the full closure unlocking lever is disposed in a position where the full closure unlocking lever overlaps the inside handle at least partially in the side view of the vehicle.

3. The vehicle door operation device according to claim 1, further comprising:

a child lock lever displaceable to a child unlocking position and a child locking position, wherein in a case the child lock lever is in the child unlocking position, the full closure unlocking lever is put in a child unlocking state in which the opening operation of the inside handle is transmitted thereto, wherein in a case the child lock lever is in the child locking position, the full closure unlocking lever is put in a child locking state in which the opening operation of the inside handle is not transmitted thereto, wherein the child lock lever is configured to be brought into abutment with the full closure unlocking lever to switch the full closure unlocking lever between the child unlocking state and the child locking state, and wherein the child lock lever is disposed in a position where the child lock lever overlaps the inside handle at least partially in a side view of the vehicle.

4. The vehicle door operation device according to claim 3, wherein the full closure unlocking lever comprises:

a lever main body to which an operation force transmitting member is connected, the operation force transmitting member being configured to transmit an operation of the full closure unlocking lever to the full closure door latch device; and a movable member configured to be brought into engagement with the lever main body in such a manner as to move relatively, wherein the movable member comprises:

an inside handle abutment portion, the second projecting portion being configured to be brought into abutment with the inside handle abutment portion; and a child lock lever abutment portion, the child lock lever being configured to be brought into abutment with the child lock lever abutment portion, wherein when the inside handle rotates in the second direction in accordance with the opening operation with the child lock lever being in the child unlocking position, the second projecting portion is brought into abutment with the inside handle abutment portion of the movable member to displace the movable member, and the lever main body is displaced in accordance with the displacement of the movable member, whereby the full closure unlocking lever is enabled to operate, and wherein when the child lock lever is displaced into the child locking position, the child lock lever is brought into abutment with the child lock lever abutment portion of the movable member to displace the movable member into a position where the second projecting portion is not brought into abutment therewith even though the inside handle rotates in the second direction in accordance with the opening operation.

5. The vehicle door operation device according to claim 1, wherein the first projecting portion is provided at a first end side of the inside handle in an axial direction of the inside handle axis, and wherein the second projecting portion is provided at a second end side of the inside handle in the axial direction, the second end side being opposite to the first end side of the inside handle.

6. The vehicle door operation device according to claim 1, further comprising:

an input member, an operation of an outside handle disposed on an outer side of the door being input to the input member, wherein a locking portion is formed on the full open unlocking lever, the input member being locked on the locking portion, wherein the locking portion has an elongate hole shape, wherein the input member is locked in such a manner as to slide in an inside of the locking portion so as to move relatively to the full open unlocking lever, wherein the input member is configured to enable the full open unlocking lever to operate when the operation of the outside handle is transmitted to the input member, and wherein when the full open unlocking lever is enabled to operate in accordance with the closing operation of the inside handle, the input member moves relatively to the full open unlocking lever in the inside of the locking portion and does not change its position in the vehicle door operation device.

7. The vehicle door operation device according to claim 1, wherein (a) the inside handle axis and (b) a common rotational axis of the full open unlocking lever and the full closure unlocking lever provided by the lever shaft extend in directions perpendicular to each other.

* * * * *